US012463342B2

(12) United States Patent
Batra et al.

(10) Patent No.: US 12,463,342 B2
(45) Date of Patent: Nov. 4, 2025

(54) STACKED PATCH ANTENNA DEVICE

(71) Applicant: HUAWEI TECHNOLOGIES CO., LTD., Shenzhen (CN)

(72) Inventors: Rahul Batra, Munich (DE); Simon Tejero Alfageme, Munich (DE); Jordi Balcells Ventura, Munich (DE); Sebastian Ilsanker, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 179 days.

(21) Appl. No.: 18/513,237

(22) Filed: Nov. 17, 2023

(65) Prior Publication Data

US 2024/0162617 A1 May 16, 2024

Related U.S. Application Data

(63) Continuation of application No. PCT/EP2021/078554, filed on Oct. 15, 2021.

(51) Int. Cl.
*H01Q 9/04* (2006.01)
*H01Q 1/38* (2006.01)
*H01Q 1/48* (2006.01)

(52) U.S. Cl.
CPC ............. *H01Q 9/0414* (2013.01); *H01Q 1/38* (2013.01); *H01Q 1/48* (2013.01)

(58) Field of Classification Search
CPC .......... H01Q 9/0414; H01Q 1/38; H01Q 1/48; H01Q 5/40; H01Q 9/0435
See application file for complete search history.

(56) References Cited

U.S. PATENT DOCUMENTS 6,639,558 B2 * 10/2003 Kellerman ............. H01Q 21/28 343/846
7,295,167 B2 * 11/2007 Aminzadeh .............. H01Q 5/40 343/846

(Continued)

FOREIGN PATENT DOCUMENTS

EP 3598573 A1 1/2020

OTHER PUBLICATIONS

Subirana et al., "GNSS Signal," Retrieved from https://gssc.esa.int/navipedia/index.php title = GNSS _ signal & oldid =12967, total 3 pages, Navipedia (2011).

(Continued)

*Primary Examiner* — Seung H Lee
(74) *Attorney, Agent, or Firm* — Leydig, Voit & Mayer, Ltd.

(57) ABSTRACT

A stacked patch antenna device is provided which comprises: a ground layer and a stack of patch antenna elements being mounted over each other and over the ground layer. Each patch antenna element comprises: a metal sheet having a plurality of peripheral areas; at least one feeding pin configured to connect the patch antenna element to a feeding circuit for inductively feeding the patch antenna element. Each patch antenna element comprises a plurality of capacitive pads for capacitively coupling the patch antenna element with another patch antenna element underneath the patch antenna element or with the ground layer. Each capacitive pad is mounted below a respective peripheral area of the metal sheet and attached to the respective peripheral area of the metal sheet by a metal connector.

17 Claims, 18 Drawing Sheets

(56) References Cited

U.S. PATENT DOCUMENTS

| | | | | |
|---|---|---|---|---|
| 8,111,196 | B2 * | 2/2012 | Thiam | H01Q 5/40<br>455/78 |
| 8,842,045 | B2 * | 9/2014 | Tatarnikov | H01Q 21/30<br>343/846 |
| 11,283,174 | B2 * | 3/2022 | Cho | H01Q 9/0414 |
| 11,695,219 | B2 * | 7/2023 | Govoni | H01Q 21/065<br>343/702 |
| 2009/0140930 | A1 | 6/2009 | Tatarnikov et al. | |

OTHER PUBLICATIONS

Kammerer., "Compact Ring Antennas for Satellites and Terrestrial Transmission Services in Vehicle," University of the Federal Wehr Munich Faculty of Electrical Engineering and Information Technology, total 360 pages (Sep. 22, 2014). With an English Translation.

* cited by examiner

300

STACKED PATCH ANTENNA DEVICE

CROSS-REFERENCE TO RELATED APPLICATIONS

This application is a continuation of International Application No. PCT/EP2021/078554, filed on Oct. 15, 2021, the disclosure of which is hereby incorporated by reference in its entirety.

TECHNICAL FIELD

Embodiments of the present disclosure relate to the field of antenna design for satellite-based navigation. Embodiments of the disclosure relate to a stacked patch antenna device and a method for producing such device. Embodiments of the disclosure also relate to a compact Global Navigation Satellite System (GNSS) stacked patch antenna with capacitive coupling.

BACKGROUND

In satellite-based navigation applications such as automotive and industrial applications, for example, that are based on the Global Navigation Satellite System (GNSS), the upper L-band covering 1.559-1.610 GHz and the lower L-band covering 1.164-1.254 GHz, are used for receiving navigation signals. The lower band frequencies L2 and L5 (1.171-1.254 GHz), provide improved performance ranging and better code measurement than the upper band frequencies L1 (1.559-1.610 GHz). Therefore, current standard GNSS antennas used in automotive sector operate on both L1 and L2 or L5 frequencies for accurate location evaluation. Several stacked patch antenna solutions for GNSS L1 and L2/L5 are available. However, they are mostly costly and heavy due to higher dielectric substrates used in the antennas.

SUMMARY

Embodiments of the present disclosure provide a solution for novel GNSS stacked patch antennas, that can overcome the above-described disadvantages of available GNSS stacked patch antennas. In particular, a novel patch antenna and fabrication thereof is presented that results in reduced cost, size and weight of the antenna.

The foregoing and other objects are achieved by the features of the independent claims. Further implementation forms are apparent from the dependent claims, the description and the figures.

A basic idea of this novel antenna concept is the use of capacitive loading of the patch built in air. This concept is applied to the GNSS stacked patch antennas. For stability and ease of fabrication the capacitance is built through pads etched on a thin layer of low loss dielectrics. This technique of building the patches makes them virtually in air and requires minimum use of substrate. This reduces size, volume and cost of the patches, without significant increase of complexity.

The novel antenna concept is based on the following design rules: Using capacitive loading of the patch to reduce size of the antenna; applying a feeding mechanism that is based on feeding pins; using patch elements in a stacked configuration; implementing the capacitance by using pads on a separate substrate or in air.

The disclosed antenna concept is a novel concept for dual band stacked patch antennas for GNSS applications. By applying patch elements placed in air instead of on a dielectric substrate, weight reduction of the antenna can be realized. By utilizing capacitive loading of the patch, size reduction of the antenna can be achieved. The capacitive loading of the patch can be achieved, for example, by folding patch edges on four corners to the ground. The capacitance can be built between the ground and the four folded patch corners ending in rectangular, square, circular, or any polygon shaped pads. The capacitance can be controlled with size of the pads and can be built in air or on a thin layer of the dielectric for ease of fabrication.

The disclosed design provides reduced size and weight of the antenna device. Due to the reduced amount of substrate the antenna can be made light in weight. Additionally, the fabrication costs of the antenna can be decreased.

According to a first aspect, the disclosure relates to a stacked patch antenna device, comprising: a ground layer; and a stack of patch antenna elements being mounted over each other and over the ground layer, each patch antenna element of the stack comprising: a metal sheet having a plurality of peripheral areas; at least one feeding pin configured to connect the patch antenna element to a feeding circuit for inductively feeding the patch antenna element; and a plurality of capacitive pads for capacitively coupling the patch antenna element with another patch antenna element underneath the patch antenna element or with the ground layer, wherein each capacitive pad is mounted below a respective peripheral area of the metal sheet and attached to the respective peripheral area of the metal sheet by a metal connector.

The stacking of the patch antenna elements can be in air instead of a dielectric substrate, this reduces weight of the antenna device. Further, the capacitive loading of the patch antenna elements reduces the size of the patch antenna elements, thereby also reducing weight of the whole antenna device.

An advantage of the stacked patch antenna device is the reduced size and weight. Due to the reduced amount of substrate the antenna becomes light in weight. The specific design of such a stacked patch antenna device allows to reduce fabrication costs, in particular in comparison to standard patch antennas.

In an implementation of the stacked patch antenna device, the metal connector of the metal sheet is formed from a portion of the metal sheet protruding from a respective peripheral area of the metal sheet and which portion of the metal sheet is bent towards the respective capacitive pad.

This provides that the metal connector can be easily fabricated. For example, in a first production step, a sheet of metal can be punched out to form the metal sheet with tongues at the peripheral areas of the metal sheet. The tongues can be bent in a next production step to form the metal connectors for connection with the capacitive pads. Even the capacitive pads can be formed from the original sheet of metal, e.g., by a double-bending process.

In an implementation of the stacked patch antenna device, the metal connector of the metal sheet comprises a metal pin attaching the capacitive pad to the respective peripheral area of the metal sheet.

This provides that the metal connector can be easily fabricated. For example, the metal pin can have a narrow base body that can be inserted into a hole in the metal sheet, and a head piece that is wider than the base body and prevents the metal pin from slipping through the hole in the metal sheet. This allows the metal pin to be attached to the metal sheet in an efficient manner. On the other side, the metal pin can be soldered on the capacitive pad. Alternatively, a screw joint, a riveted joint, a bonded joint or an adhesive bond can be easily implemented.

In an implementation of the stacked patch antenna device, each capacitive pad of the patch antenna element is capacitively coupled to the metal sheet of the other patch antenna element underneath the patch antenna element or with the ground layer via an air gap.

This provides that a capacitive coupling by an air gap reduces the weight of the stacked patch antenna device, since air is lighter than any other dielectric substrate. Further, the capacitive loading of the patch antenna elements reduces the size of the patch antenna elements, thereby also reducing weight of the whole antenna device.

In an implementation of the stacked patch antenna device, each patch antenna element of the stack comprises a dielectric substrate layer configured to capacitively couple the capacitive pads of the patch antenna element with the other patch antenna element underneath the patch antenna element or with the ground layer.

The fabrication process can be thus facilitated since the dielectric substrate layer can be mounted on the metal sheet and the capacitive pads can be mounted on the dielectric substrate layer. Besides, using the dielectric substrate layer stabilizes the whole stack of patch antenna elements since all components are firmly connected to each other and the capacitive pads are not floating in the air.

In an implementation of the stacked patch antenna device, the capacitive pads of the patch antenna element are mounted on the dielectric substrate layer of the patch antenna element.

This provides a stable and robust construction, since the capacitive pads are firmly mounted on the dielectric substrate layer of the patch antenna element and are therefore not floating in the air.

In an implementation of the stacked patch antenna device, a patch antenna element of the stack is connected with another patch antenna element of the stack by an adhesive sheet.

Using the adhesive sheet results in a stable and robust construction.

In an implementation of the stacked patch antenna device, the adhesive sheet is configured to connect the dielectric substrate layer of the patch antenna element to the metal sheet of the other patch antenna element underneath the patch antenna element.

The adhesive layer can be used for an efficient and stable connection of the dielectric substrate layer of the patch antenna element with the metal sheet of the other patch antenna element.

In an implementation of the stacked patch antenna device, the patch antenna elements are stacked in air above each other and above the ground layer.

By such stacking in air, material can be saved which thereby reduces weight of the whole antenna device.

In an implementation of the stacked patch antenna device, the metal sheet of each patch antenna element is rectangular, square, circular or polygon shaped.

Thus, different shaped antenna devices can be implemented. The shape can be designed, e.g., according to design requirements.

For a rectangular or square shaped metal sheet, the peripheral areas can be corner areas of the metal sheet, for example, the four corners of the metal sheet. For a polygon shaped metal sheet, the peripheral areas can be the corner areas of the polygon, e.g., three corners for a triangle, four corners for a rectangle, five corners for a pentagon, six corners for a hexagon, etc. For a circular shaped metal sheet, the peripheral areas can be located at the circumference of the metal sheet, for example with the same circumferential distance between any two of them.

In an implementation of the stacked patch antenna device, the capacitive pads of each patch antenna element are rectangular, square, circular or polygon shaped.

This provides the advantage of flexibility for the design process. Depending on the shape of the capacitive pads, different capacitance values can be realized.

In an implementation of the stacked patch antenna device, all the feeding pins of a patch antenna element of the stack are electrically insulated from another patch antenna element of the stack and from the ground layer via through-holes.

The feeding pins of a specific patch antenna element are not in electrical contact with the metal sheet of another patch antenna element or with the ground layer. Thus, the feeding pins are only used for feeding the specific patch antenna element.

In an implementation of the stacked patch antenna device, all the feeding pins of the patch antenna element extend through the through-holes of the other patch antenna element of the stack and the through-holes of the ground layer.

The feeding pins of a specific patch antenna element are efficiently electrically insulated from the other patch antenna element and from the ground layer.

In an implementation of the stacked patch antenna device, all the feeding pins are configured to electrically and mechanically connect the patch antenna elements with a printed circuit board comprising the feeding circuit.

Thus, the feeding pins can be used for both, electrical and mechanical connection.

In an implementation of the stacked patch antenna device, each patch antenna element of the stack comprises: two feeding pins for dual-feeding the patch antenna element in a circular polarization mode.

This provides the advantage that the feeding pins efficiently implement dual-feeding of the patch antenna element in circular polarization mode.

In an implementation of the stacked patch antenna device, the two feeding pins are connected to two feeding points on the metal sheet of the patch antenna element, wherein the two feeding points are arranged at an angle of 90 degrees with respect to a center of the metal sheet.

This provides efficient circular polarization, which can be achieved by such specific design.

In an implementation of the stacked patch antenna device, each patch antenna element is configured to receive navigation signals from a Global Navigation Satellite System in a different frequency band.

Thus, the stacked patch antenna device can be efficiently implemented in GNSS applications, e.g. satellite-based navigation.

According to a second aspect, embodiments of the present disclosure relate to a method for producing a stacked patch antenna device, the method comprising: providing a ground layer; and mounting a stack of patch antenna elements over each other and over the ground layer, wherein each patch antenna element of the stack comprises: a metal sheet having a plurality of peripheral areas; at least one feeding pin configured to connect the patch antenna element to a feeding circuit for inductively feeding the patch antenna element; and a plurality of capacitive pads for capacitively coupling the patch antenna element with another patch antenna element underneath the patch antenna element or with the ground layer, wherein each capacitive pad is mounted below a respective peripheral area of the metal sheet and attached to the respective peripheral area of the metal sheet by a metal connector.

The advantages of the method are the same as those for the corresponding implementation forms of the stacked patch antenna device described above.

I.e., the stacked patch antenna device fabricated by such a method can have reduced size and weight. Due to the reduced amount of substrate the antenna becomes light in weight. The specific design of the stacked patch antenna device allows to reduce fabrication costs.

According to a third aspect, the disclosure relates to a computer program product including computer executable code or computer executable instructions that, when executed, causes at least one computer to execute the method according to the second aspect described above.

Such a computer program product can be implemented for example on a manufacturing machine, e.g., a computer numerical control (CNC) of a manufacturing machine or manufacturing robot.

BRIEF DESCRIPTION OF THE DRAWINGS

Further embodiments of the present disclosure will be described with respect to the following figures, in which.

DETAILED DESCRIPTION OF EMBODIMENTS

Figure 1:
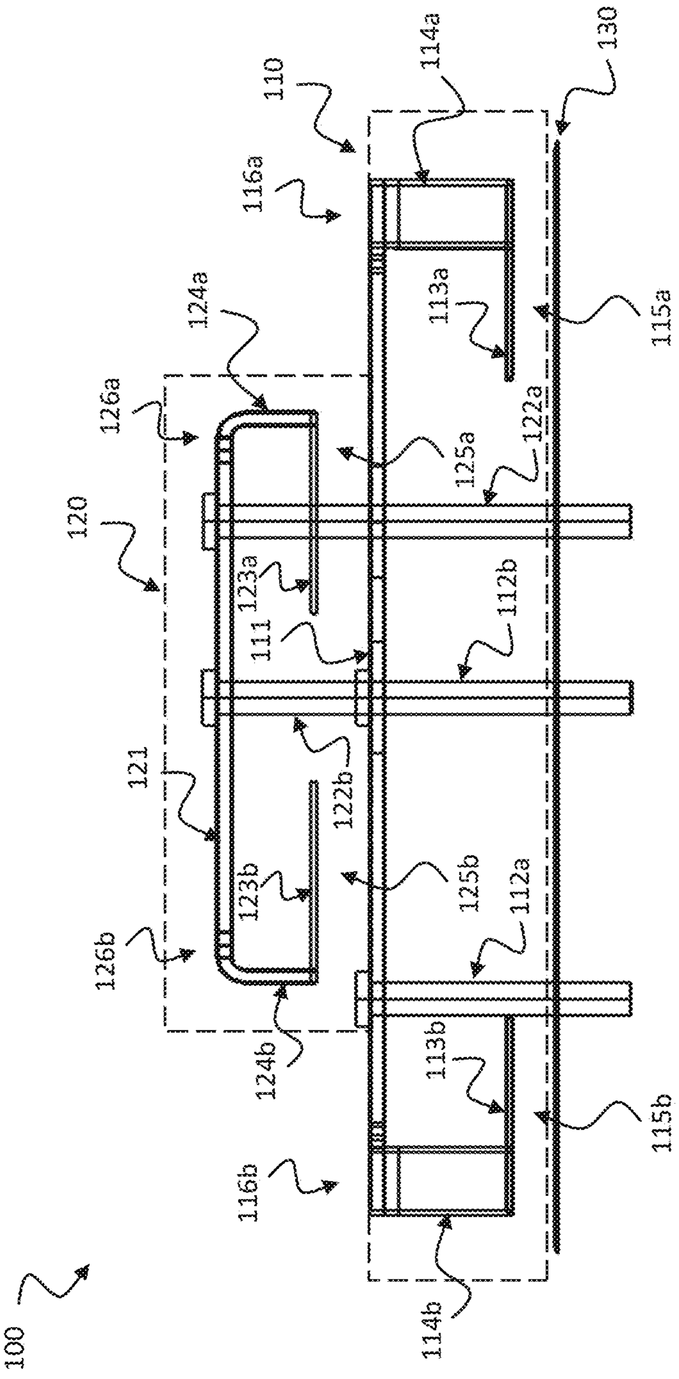
FIG. 1 shows a cross section of a stacked patch antenna device 100 according to a first embodiment.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The stacked antenna devices described herein may, for example, be implemented in automotive, industrial or consumer electronic applications, e.g., for satellite-based navigation tasks, etc.

In this disclosure, patch antennas and stacked patch antennas are described.

A patch antenna is a type of antenna with a low profile, which can be mounted on a surface. It consists of a planar rectangular, circular, triangular, or any geometrical sheet or "patch" of metal, mounted over a larger sheet of metal called a ground plane. The two metal sheets together form a resonant piece of microstrip transmission line with a length of approximately one-half wavelength of the radio waves. The radiation at the edges causes the antenna to act slightly larger electrically than its physical dimensions, so in order for the antenna to be resonant, a length of microstrip transmission line slightly shorter than one-half the wavelength at the frequency is used. The patch antenna is mainly practical at microwave frequencies, at which wavelengths are short enough that the patches are conveniently small. It can be easily used in portable wireless devices because of the ease of fabricating it on printed circuit boards (PCBs).

A stacked patch antenna consists of two (or more) patches stacked on top of each other. In a stacked patch antenna for GNSS L1 and L2 or L5 frequencies, the patch on top is dedicated for the GNSS L1 frequency, while the bottom patch is for the GNSS L2/L5 frequency. The patches are printed on different or same dielectric materials. Both the patches can be fed independently using single or dual feed-pins. In case of the single feeding the edges of the patches are truncated on two sides to achieve circular polarization. For dual feed stacked patch, the output of the pins are combined using a hybrid coupler to achieve circular polarization. In a four-feed stacked patch, all four pins feed the upper patch and capacitively feed the lower patch.

FIG. 1 shows a cross section of a stacked patch antenna device 100 according to a first embodiment.

The stacked patch antenna device 100 comprises a ground layer 130; and a stack of patch antenna elements 110, 120 mounted over each other and over the ground layer 130.

Each patch antenna element 110, 120 of the stack comprises: a metal sheet 111, 121 having a plurality of peripheral areas 116*a*, 116*b*, 126*a*, 126*b*; at least one feeding pin 112*a*, 112*b*, 122*a*, 122*b* configured to connect the patch antenna element 110, 120 to a feeding circuit for inductively feeding the patch antenna element 110, 120; and a plurality of capacitive pads 113*a*, 113*b*, 123*a*, 123*b* for capacitively coupling the patch antenna element 110, 120 with another patch antenna element 110 underneath the patch antenna element 120 or with the ground layer 130.

Each capacitive pad 113*a*, 113*b*, 123*a*, 123*b* is mounted below a respective peripheral area 116*a*, 116*b*, 126*a*, 126*b* of the metal sheet 111, 121 and attached to the respective peripheral area 116*a*, 116*b*, 126*a*, 126*b* of the metal sheet 111, 121 by a metal connector 114*a*, 114*b*, 124*a*, 124*b*.

The stacking of the patch antenna elements can be in air instead of a dielectric substrate, this reduces weight of the antenna device. Further, the capacitive loading of the patch antenna elements reduces the size of the patch antenna elements, thereby also reducing weight of the whole antenna device.

The metal connector 114*a*, 114*b*, 124*a*, 124*b* of the metal sheet 111, 121 can be formed from a portion of the metal sheet 111, 121 protruding from a respective peripheral area 116*a*, 116*b*, 126*a*, 126*b* of the metal sheet 111, 121 and which portion of the metal sheet 111, 121 is bent towards the respective capacitive pad 113*a*, 113*b*, 123*a*, 123*b*.

Figure 2:
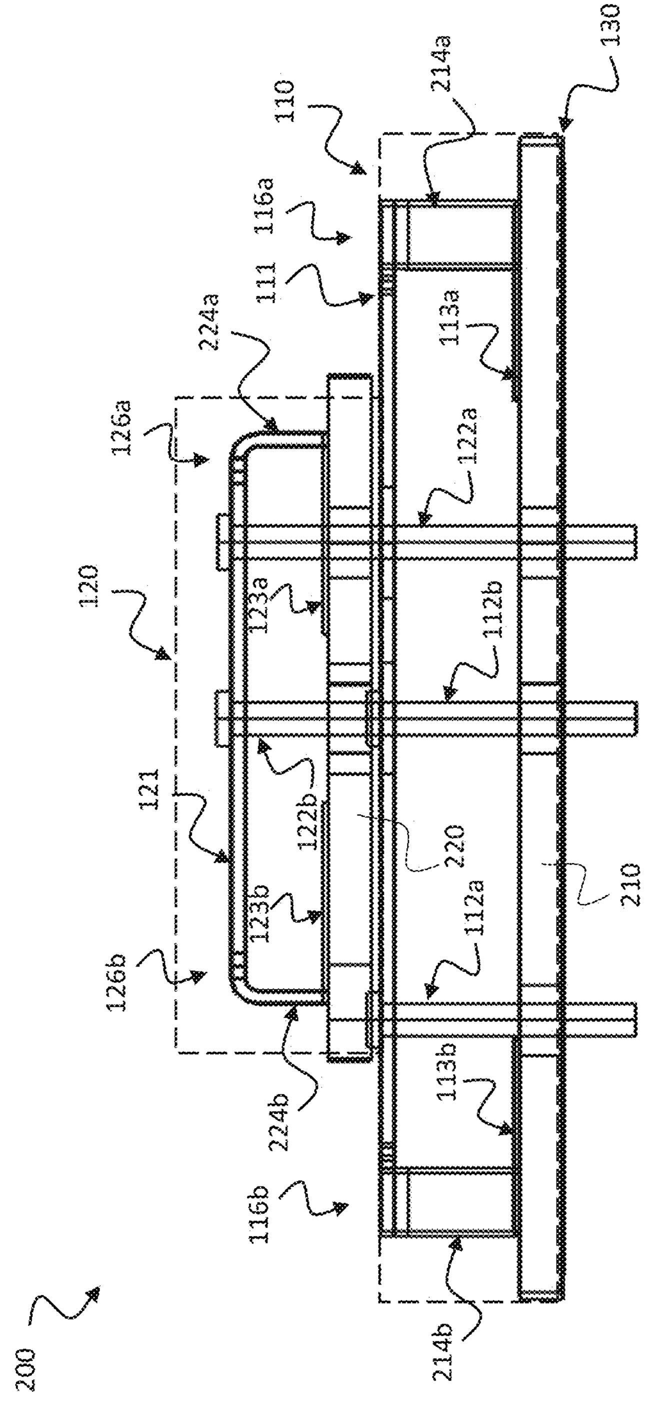
FIG. 2 shows a cross section of a stacked patch antenna device 200 according to a second embodiment.

The same feature also applies to the stacked patch antenna device 200 shown in FIG. 2.

Figure 3:
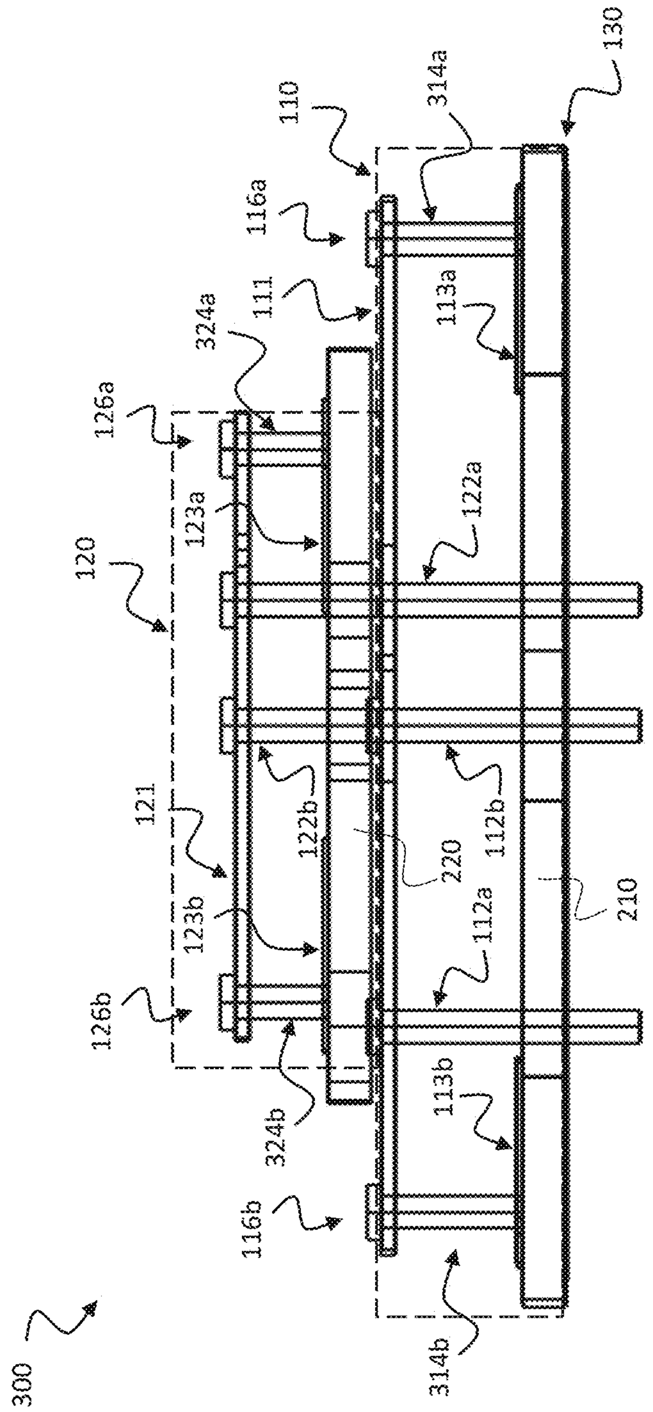
FIG. 3 shows a cross section of a stacked patch antenna device 300 according to a third embodiment.

Alternatively, the metal connector 114*a*, 114*b*, 124*a*, 124*b* of the metal sheet 111, 121 can comprises a metal pin 314*a*, 314*b*, 324*a*, 324*b*, e.g. as shown in FIG. 3 and not shown in FIG. 1, attaching the capacitive pad 113*a*, 113*b*, 123*a*, 123*b* to the respective peripheral area 116*a*, 116*b*, 126*a*, 126*b* of the metal sheet 111, 121.

Each capacitive pad 113*a*, 113*b*, 123*a*, 123*b* of the patch antenna element 110, 120 is capacitively coupled to the metal sheet of the other patch antenna element 110 underneath the patch antenna element 120 or with the ground layer 130 via an air gap 115*a*, 115*b*, 125*a*, 125*b* as shown in FIG. 1.

In an alternative embodiment as shown in FIG. 2, each patch antenna element 110, 120 of the stack may comprise a dielectric substrate layer 210, 220 (not shown in the embodiment of FIG. 1) configured to capacitively couple the capacitive pads 113*a*, 113*b*, 123*a*, 123*b* of the patch antenna element 110, 120 with the other patch antenna element 110 underneath the patch antenna element 120 or with the ground layer 130.

In the alternative embodiment shown in FIG. 2, the capacitive pads 113*a*, 113*b*, 123*a*, 123*b* of the patch antenna element 110, 120 may be mounted on the dielectric substrate layer 210, 220 of the patch antenna element 110, 120.

In an alternative embodiment, not shown in FIG. 1, a patch antenna element 110, 120 of the stack may be connected with another patch antenna element 110 of the stack by an adhesive sheet 221.

This adhesive sheet 221 may be configured to connect the dielectric substrate layer 210, 220 of the patch antenna element 110, 120 to the metal sheet 111, 121 of the other patch antenna element 110, 120 underneath the patch antenna element 120.

The patch antenna elements 110, 120 are stacked in air above each other and above the ground layer 130.

The metal sheet 111, 121 of each patch antenna element 110, 120 can be rectangular, square, circular or polygon shaped.

For a rectangular or square shaped metal sheet, the peripheral areas can be corner areas of the metal sheet, for example, the four corners of the metal sheet. For a polygon shaped metal sheet, the peripheral areas can be the corner areas of the polygon, e.g., three corners for a triangle, four corners for a rectangle, five corners for a pentagon, six corners for a hexagon, etc. For a circular shaped metal sheet, the peripheral areas can be located at the circumference of the metal sheet, for example with the same circumferential distance between any two of them.

The capacitive pads 113*a*, 113*b*, 123*a*, 123*b* of each patch antenna element 110, 120 may be rectangular, square, circular or polygon shaped.

All the feeding pins 112*a*, 112*b*, 122*a*, 122*b* of a patch antenna element 110, 120 of the stack may be electrically insulated from another patch antenna element of the stack and from the ground layer 130 via through-holes. These through-holes are through-holes in the metal sheets of the patch antenna elements and in the ground layer 130.

All the feeding pins 112*a*, 112*b*, 122*a*, 122*b* of the patch antenna element 120 may extend through the through-holes of the other patch antenna element 110 of the stack and the through-holes of the ground layer 130.

All the feeding pins 112*a*, 112*b*, 122*a*, 122*b* may be configured to electrically and mechanically connect the patch antenna elements 110, 120 with a printed circuit board comprising the feeding circuit.

Figure 5:
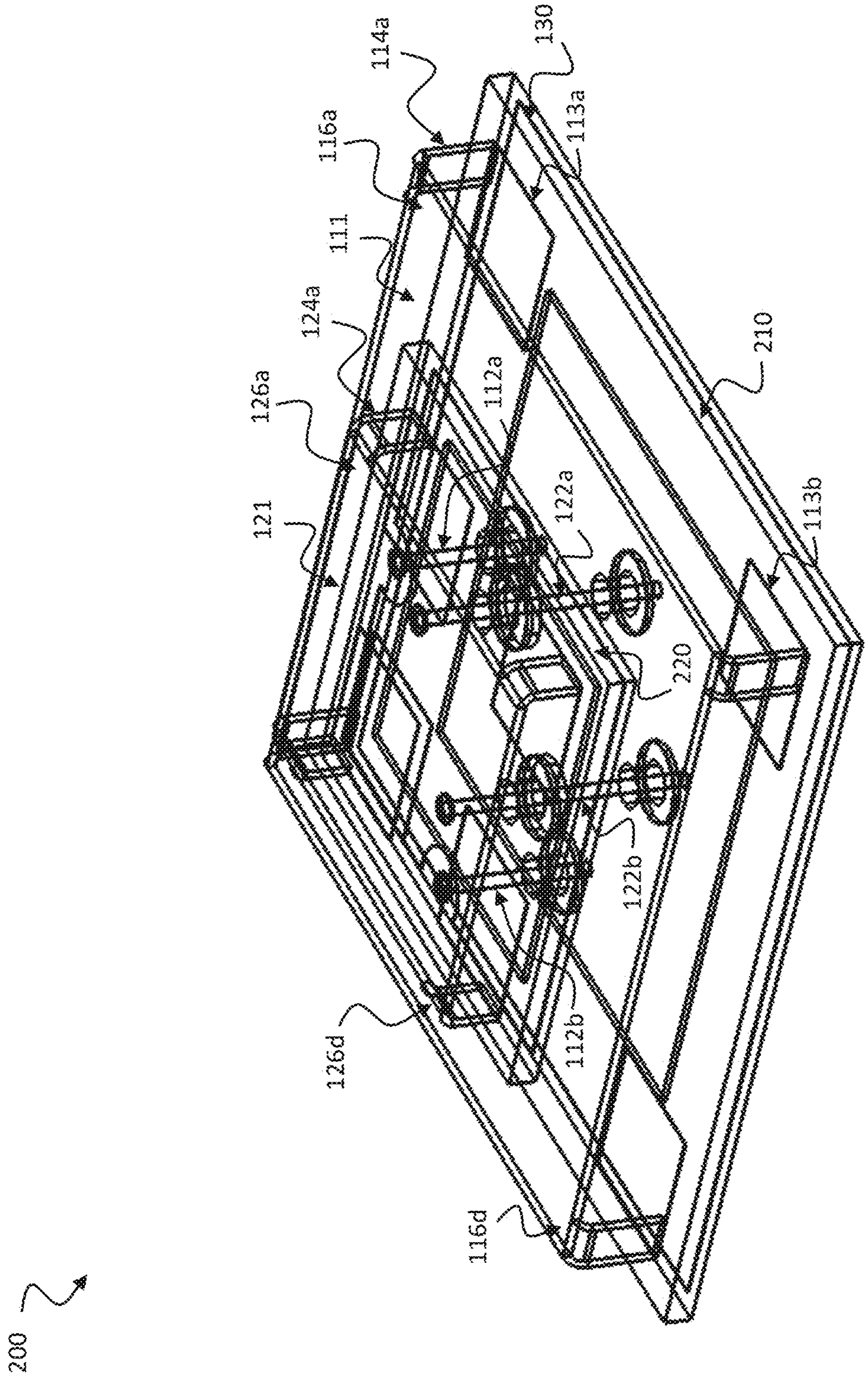
FIG. 5 shows a 3-dimensional view of the stacked patch antenna device 200 according to the second embodiment.
Figure 6:
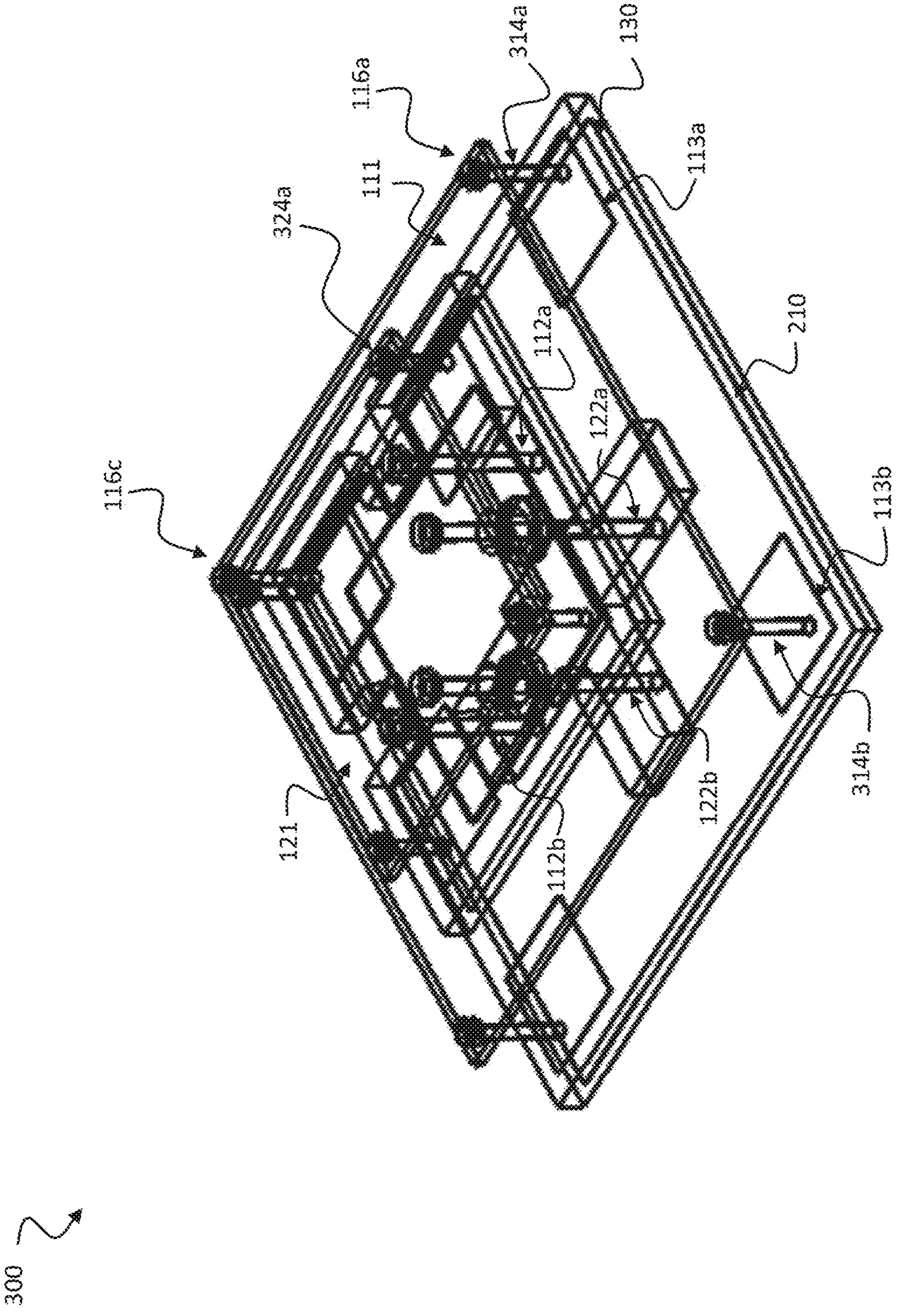
FIG. 6 shows a 3-dimensional view of the stacked patch antenna device 300 according to the third embodiment.

The feeding pins 112*a*, 112*b* connect the patch antenna element 110 with the printed circuit board, while the feeding pins 122*a*, 122*b* connect the patch antenna element 120 with the printed circuit board. Note that in the FIGS. 1 to 3, the feeding pin 112*b* of the bottom patch antenna element 110 is behind the feeding pin 122*b* of the upper patch antenna element 120 because of the specific view in FIGS. 1 to 3. In FIGS. 5 and 6 all feeding pins can be seen.

Each patch antenna element 110, 120 of the stack may comprise two feeding pins 112*a*, 112*b*, 122*a*, 122*b* for dual-feeding the patch antenna element 110, 120 in a circular polarization mode.

The two feeding pins 112*a*, 112*b*, 122*a*, 122*b* may be connected to two feeding points on the metal sheet 111, 121 of the patch antenna element 110, 120. The two feeding points can be arranged at an angle of about 90 degrees with respect to a center of the metal sheet 111, 121 in order to provide a circular polarization mode.

Each patch antenna element 110, 120 can be configured to receive navigation signals from a Global Navigation Satellite System in a different frequency band.

In one implementation of the stacked patch antenna device 100 as shown in FIG. 1, the antenna can be divided into two parts 110, 120. The lower patch 110 can be used for L2 or L5 frequency with folded arms 114*a*, 114*b* connected to four capacitive pads 113*a*, 113*b*. The pads can be implemented in air 115*a*, 115*b* as shown in the embodiment in FIG. 1 or on the top of a thin substrate material 210 as shown in the embodiments in FIGS. 2 to 3 and 5 to 10. These pads build capacitance with the ground layer 130 on the bottom side of the substrate. The upper patch 120 can be used for L1 frequency with four folded arms 124*a*, 124*b* connected to the capacitive pads 123*a*, 123*b*. Again, the pads can be implemented on a substrate 220 as shown in the embodiments in FIGS. 2 to 3 and 5 to 10 or in air 125*a*, 125*b* as shown in the embodiment in FIG. 1.

The size of the capacitive pads, the distance of the capacitive pads from the ground and the substrate material determine the amount of capacitance. The higher the capacitance the lower is the size of the patch element needed. Therefore, in comparison to a standard patch of size lambda/2, i.e., half wavelength size, the size of the patch with capacitive loading can be significantly reduced by increasing the size the capacitance. A trade-off can be easily found depending upon the required size of the antenna (patch and pads size) and the antenna performance.

A simplified feeding mechanism can be used to feed the patches independently using dual feed pins. The pins for the top patch 120 extend through holes in the lower patch 110. The top and bottom patch antennas 110, 120 can be stacked using for example a double-sided tape. The disclosed antenna can also be fabricated using separate pins to connect the edges of the radiating patch to the pads on the substrate, instead of folding the patch corners. An example of using such an implementation using pins is shown in FIG. 3, for example.

FIG. 2 shows a cross section of a stacked patch antenna device 200 according to a second embodiment.

The stacked patch antenna device 100 comprises a ground layer 130; and a stack of patch antenna elements 110, 120 mounted over each other and over the ground layer 130.

Each patch antenna element 110, 120 of the stack comprises: a metal sheet 111, 121 having a plurality of peripheral areas 116*a*, 116*b*, 126*a*, 126*b*; at least one feeding pin 112*a*, 112*b*, 122*a*, 122*b* configured to connect the patch antenna element 110, 120 to a feeding circuit for inductively feeding the patch antenna element 110, 120; and a plurality of capacitive pads 113*a*, 113*b*, 123*a*, 123*b* for capacitively coupling the patch antenna element 110, 120 with another patch antenna element 110 underneath the patch antenna element 120 or with the ground layer 130.

Each capacitive pad 113*a*, 113*b*, 123*a*, 123*b* is mounted below a respective peripheral area 116*a*, 116*b*, 126*a*, 126*b* of the metal sheet 111, 121 and attached to the respective peripheral area 116*a*, 116*b*, 126*a*, 126*b* of the metal sheet 111, 121 by a metal connector 214*a*, 214*b*, 224*a*, 224*b*.

This second embodiment 200 is similar to the first embodiment 100 but the air gaps 115*a*, 115*b*, 125*a*, 125*b* of the stacked patch antenna device 100 are filled with a dielectric substrate layer 210, 220.

The metal connector 214*a*, 214*b*, 224*a*, 224*b* of the metal sheet 111, 121 can be formed from a portion of the metal sheet 111, 121 protruding from a respective peripheral area 116*a*, 116*b*, 126*a*, 126*b* of the metal sheet 111, 121 and which portion of the metal sheet 111, 121 is bent towards the respective capacitive pad 113*a*, 113*b*, 123*a*, 123*b*.

Each patch antenna element 110, 120 of the stack comprises a dielectric substrate layer 210, 220 configured to capacitively couple the capacitive pads 113*a*, 113*b*, 123*a*, 123*b* of the patch antenna element 110, 120 with the other patch antenna element 110 underneath the patch antenna element 120 or with the ground layer 130.

The capacitive pads 113*a*, 113*b*, 123*a*, 123*b* of the patch antenna element 110, 120 may be mounted on the dielectric substrate layer 210, 220 of the patch antenna element 110, 120.

Figure 7A:
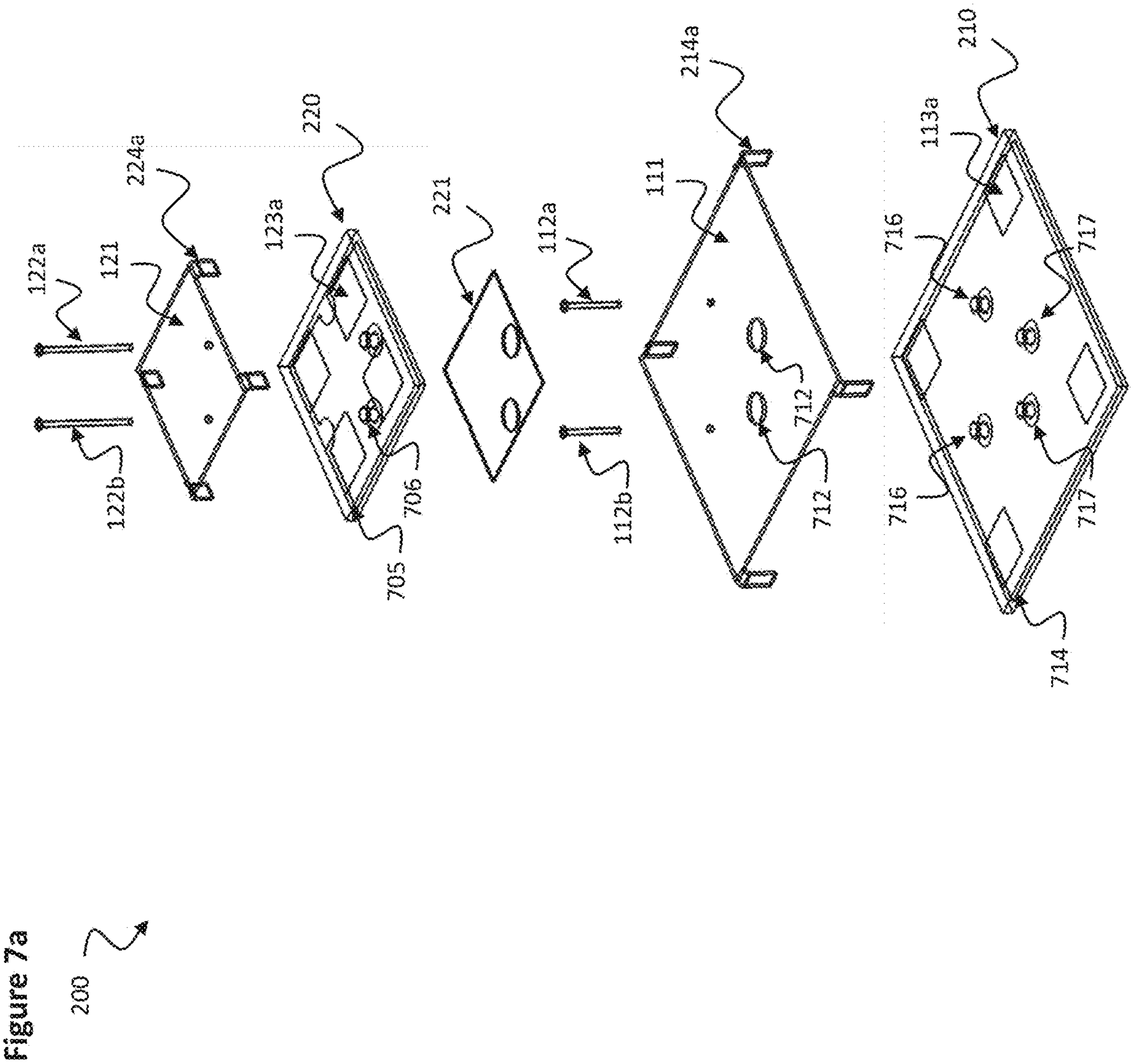
FIG. 7*a* shows an exploded view of the stacked patch antenna device 200 according to the second embodiment.
Figure 7B:
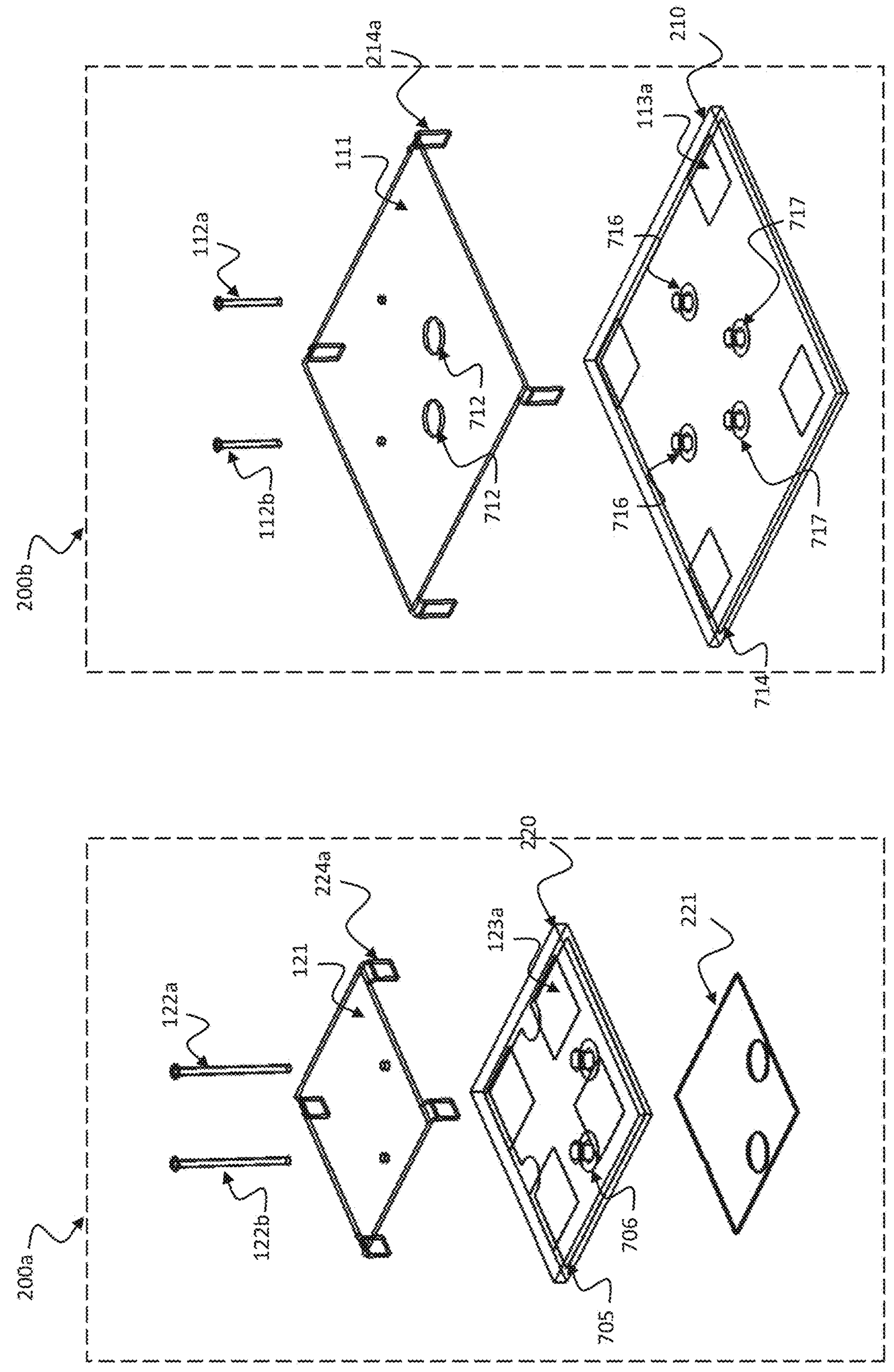
FIG. 7*b* shows a zoom of the exploded view of the stacked patch antenna device 200 shown in FIG. 7*a;*

A patch antenna element 110, 120 of the stack may be connected with another patch antenna element 110 of the stack by an adhesive sheet 221, e.g. as shown in FIGS. 7*a* and 7*b*.

This adhesive sheet 221 may be configured to connect the dielectric substrate layer 210, 220 of the patch antenna element 110, 120 to the metal sheet 111, 121 of the other patch antenna element 110, 120 underneath the patch antenna element 120.

The patch antenna elements 110, 120 are stacked in air above each other and above the ground layer 130. In the example of FIG. 2, two patch antenna elements 110, 120 are shown, but it understands that any other number of patch antenna elements can be stacked over each other, e.g., a number of 3, 4, 5, 6, 7, 8, 9, 10, etc. or even only a single patch antenna element can be mounted over the ground layer 130.

The metal sheet 111, 121 of each patch antenna element 110, 120 can be rectangular, square, circular or polygon shaped. In this embodiment 200, the metal sheets 111, 121 are rectangular shaped.

For a rectangular or square shaped metal sheet as shown in FIG. 2, the peripheral areas 116*a*, 116*b*, 126*a*, 126*b* can be corner areas of the metal sheet, for example, the four corners of the (top and bottom) metal sheet 121, 111 as shown in FIG. 2.

The capacitive pads 113*a*, 113*b*, 123*a*, 123*b* of each patch antenna element 110, 120 may be rectangular, square, circular or polygon shaped. In the embodiment 200 shown in FIG. 2, the capacitive pads 113*a*, 113*b*, 123*a*, 123*b* are rectangular.

FIG. 3 shows a cross section of a stacked patch antenna device 300 according to a third embodiment.

The stacked patch antenna device 300 comprises a ground layer 130; and a stack of patch antenna elements 110, 120 mounted over each other and over the ground layer 130.

Each patch antenna element 110, 120 of the stack comprises: a metal sheet 111, 121 having a plurality of peripheral areas 116*a*, 116*b*, 126*a*, 126*b*; at least one feeding pin 112*a*, 112*b*, 122*a*, 122*b* configured to connect the patch antenna element 110, 120 to a feeding circuit for inductively feeding the patch antenna element 110, 120; and a plurality of capacitive pads 113*a*, 113*b*, 123*a*, 123*b* for capacitively coupling the patch antenna element 110, 120 with another patch antenna element 110 underneath the patch antenna element 120 or with the ground layer 130.

Each capacitive pad 113*a*, 113*b*, 123*a*, 123*b* is mounted below a respective peripheral area 116*a*, 116*b*, 126*a*, 126*b* of the metal sheet 111, 121 and attached to the respective peripheral area 116*a*, 116*b*, 126*a*, 126*b* of the metal sheet 111, 121 by a metal connector 314*a*, 314*b*, 324*a*, 324*b*.

This second embodiment 200 is similar to the second embodiment 200 described above with respect to FIG. 2 but the metal connectors 314*a*, 314*b*, 324*a*, 324*b* are not formed from a portion of the metal sheet 111, 121 but are implemented as metal pins attaching the capacitive pads 113*a*, 113*b*, 123*a*, 123*b* to the respective peripheral area 116*a*, 116*b*, 126*a*, 126*b* of the metal sheet 111, 121.

Each patch antenna element 110, 120 of the stack comprises a dielectric substrate layer 210, 220 configured to capacitively couple the capacitive pads 113*a*, 113*b*, 123*a*, 123*b* of the patch antenna element 110, 120 with the other patch antenna element 110 underneath the patch antenna element 120 or with the ground layer 130.

The capacitive pads 113*a*, 113*b*, 123*a*, 123*b* of the patch antenna element 110, 120 may be mounted on the dielectric substrate layer 210, 220 of the patch antenna element 110, 120.

Figure 8A:
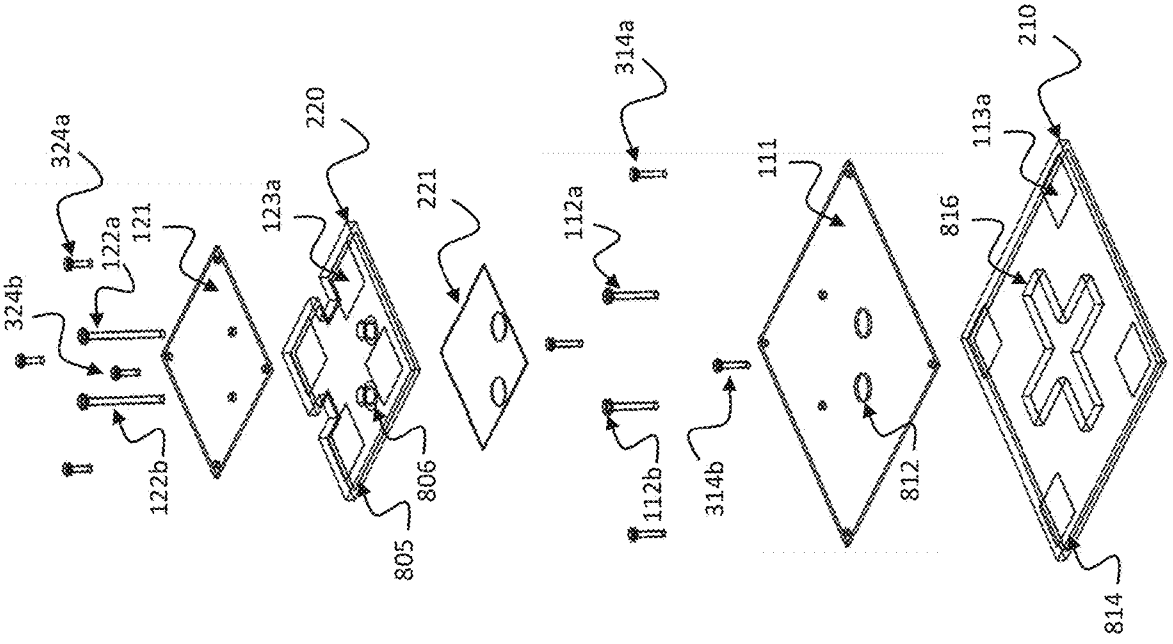
FIG. 8*a* shows an exploded view of the stacked patch antenna device 300 according to the third embodiment.
Figure 8B:
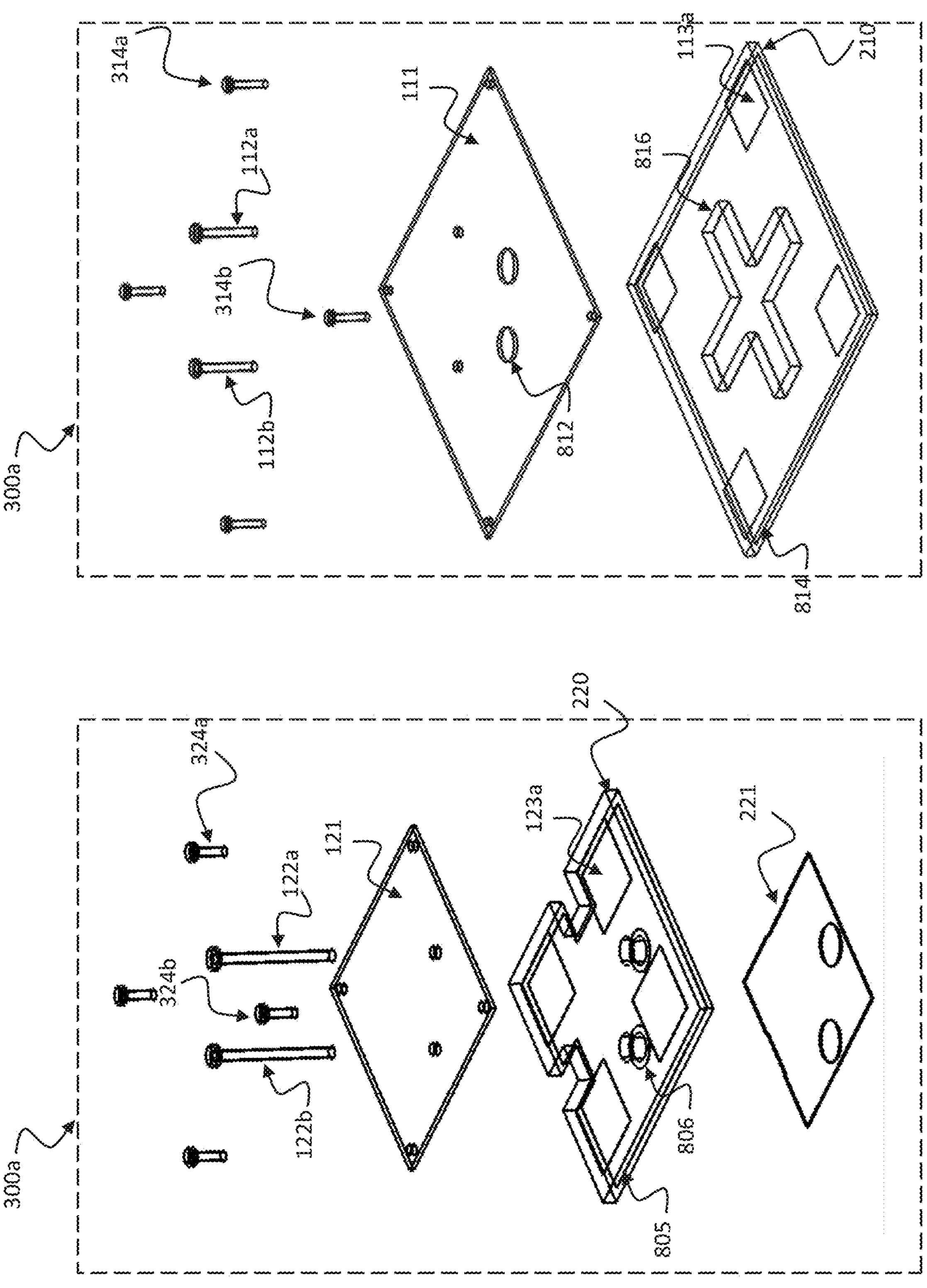
FIG. 8*b* shows a zoom of the exploded view of the stacked patch antenna device 300 shown in FIG. 8*a;*

A patch antenna element 110, 120 of the stack may be connected with another patch antenna element 110 of the stack by an adhesive sheet 221, e.g. as shown in FIGS. 8*a* and 8*b*.

This adhesive sheet 221 may be configured to connect the dielectric substrate layer 210, 220 of the patch antenna element 110, 120 to the metal sheet 111, 121 of the other patch antenna element 110, 120 underneath the patch antenna element 120.

The patch antenna elements 110, 120 are stacked in air above each other and above the ground layer 130. In the example of FIG. 3, two patch antenna elements 110, 120 are shown, but it understands that any other number of patch antenna elements can be stacked over each other, e.g., a number of 3, 4, 5, 6, 7, 8, 9, 10, etc. or even only a single patch antenna element can be mounted over the ground layer 130.

The metal sheet 111, 121 of each patch antenna element 110, 120 can be rectangular, square, circular or polygon shaped. In this embodiment 300, the metal sheets 111, 121 are rectangular shaped.

For a rectangular or square shaped metal sheet as shown in FIG. 3, the peripheral areas 116*a*, 116*b*, 126*a*, 126*b* can be corner areas of the metal sheet, for example, the four corners of the (top and bottom) metal sheet 121, 111 as shown in FIG. 3.

The capacitive pads 113*a*, 113*b*, 123*a*, 123*b* of each patch antenna element 110, 120 may be rectangular, square, circular or polygon shaped. In the embodiment 300 shown in FIG. 3, the capacitive pads 113*a*, 113*b*, 123*a*, 123*b* are rectangular.

Figure 4:
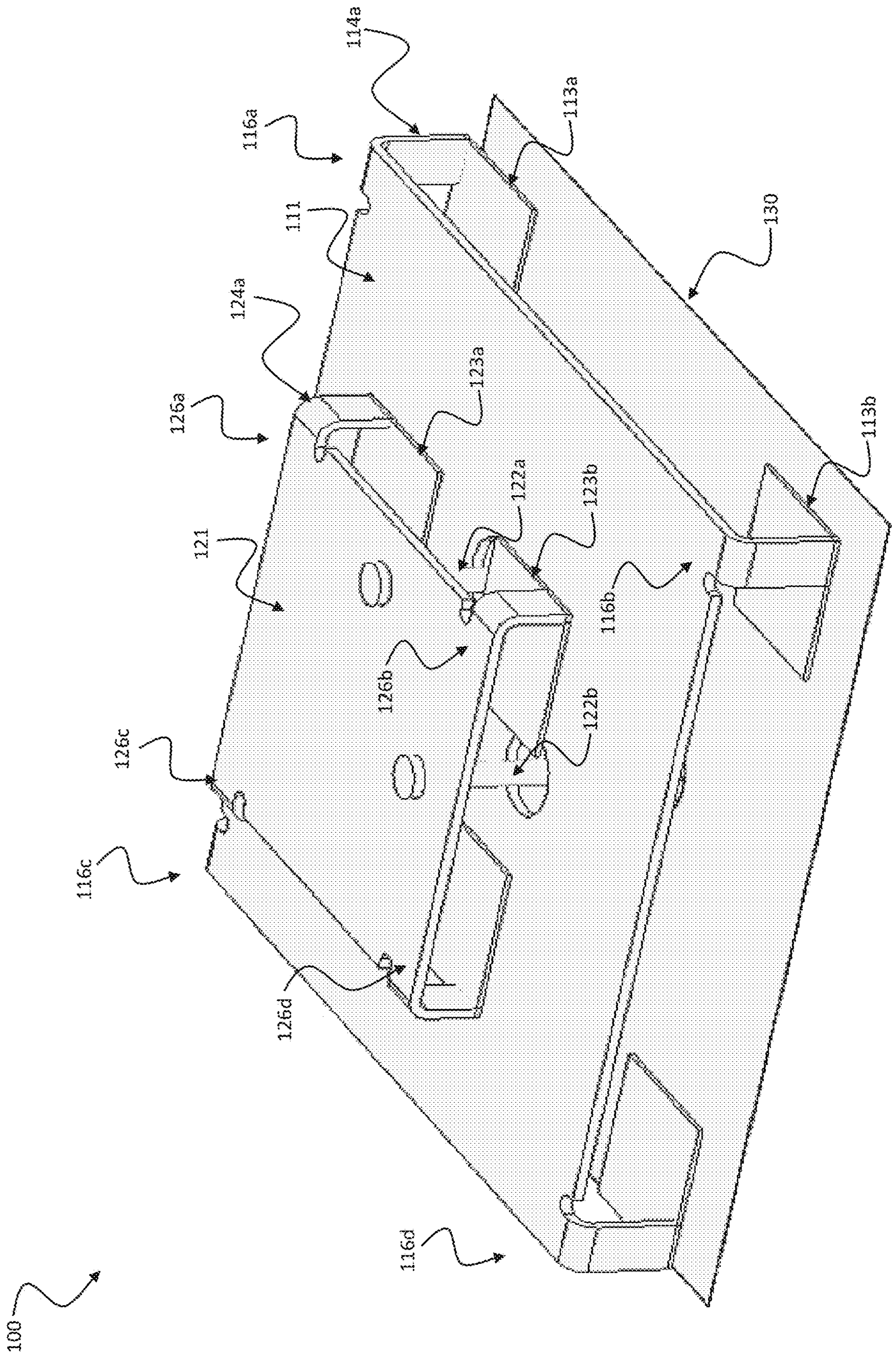
FIG. 4 shows a 3-dimensional view of the stacked patch antenna device 100 according to the first embodiment.

FIG. 4 shows a 3-dimensional view of the stacked patch antenna device 100 according to the first embodiment.

The stacked patch antenna device 100 corresponds to the stacked patch antenna device 100 shown in FIG. 1 but is illustrated in FIG. 4 in a 3-dimensional view for a better imaginable representation.

FIG. 5 shows a 3-dimensional view of the stacked patch antenna device 200 according to the second embodiment.

The stacked patch antenna device 200 corresponds to the stacked patch antenna device 200 shown in FIG. 2 but is illustrated in FIG. 5 in a 3-dimensional view for a better imaginable representation.

FIG. 6 shows a 3-dimensional view of the stacked patch antenna device 300 according to the third embodiment.

The stacked patch antenna device 300 corresponds to the stacked patch antenna device 300 shown in FIG. 3 but is illustrated in FIG. 6 in a 3-dimensional view for a better imaginable representation.

FIG. 7*a* shows an exploded view of the stacked patch antenna device 200 according to the second embodiment.

The stacked patch antenna device 200 corresponds to the stacked patch antenna device 200 shown in FIGS. 2 and 5 but is illustrated in FIG. 7*a* in an exploded view for a better imaginable representation.

In the exploded view shown in FIG. 7*a*, the following components are depicted:

- the feed pins 122*a*, 122*b* for the top patch,
- the folded sheet metal part 121 for the top patch with folded arms 224*a* on each edge,
- the substrate 220 for the top patch with ground on the bottom side 705, through-holes 706 for the feed pins 122*a*, 122*b* and capacitive pads 123*a* on the top side,
- an adhesive layer 221, e.g., a double-sided tape to connect the top patch to the bottom patch,
- feed pins 112*a*, 112*b* for the bottom patch,
- the folded sheet metal part 111 for the bottom patch with through holes 711 for the pins to the top patch and folded arms 214*a* on each edge,
- through-holes 712 in the sheet metal 111 for pins 122*a*, 122*b* of top patch,
- the substrate 210 for the bottom patch with ground on the bottom side 714, capacitive pads 113*a* on the top side, through-holes 716 for the feed pins of bottom patch and through-holes 717 for the feed pins of top patch.

FIG. 7*b* shows a zoom of the exploded view of the stacked patch antenna device 200 shown in FIG. 7*a*.

In the zoom, a left-side part 200*a* depicts the components of the top patch while a right-side part 200*b* depicts the components of the bottom patch.

The components of the top patch illustrated in the left-side part 200*a* include the following:

- the feed pins 122*a*, 122*b* for the top patch,
- the folded sheet metal part 121 for the top patch with folded arms 224*a* on each edge,
- the substrate 220 for the top patch with ground on the bottom side 705, through-holes 706 for the feed pins 122*a*, 122*b* and capacitive pads 123*a* on the top side,
- an adhesive layer 221, e.g., a double-sided tape to connect the top patch to the bottom patch.

The components of the bottom patch illustrated in the right-side part 200*b* include the following:

- feed pins 112*a*, 112*b* for the bottom patch,
- the folded sheet metal part 111 for the bottom patch with through holes 711 for the pins to the top patch and folded arms 214*a* on each edge,
- the substrate 210 for the bottom patch with ground on the bottom side 714, capacitive pads 113*a* on the top side, through-holes 716 for the feed pins of bottom patch and through-holes 717 for the feed pins of top patch.

FIG. 8*a* shows an exploded view of the stacked patch antenna device 300 according to the third embodiment.

The stacked patch antenna device 300 corresponds to the stacked patch antenna device 300 shown in FIGS. 3 and 6 but is illustrated in FIG. 8*a* in an exploded view for a better imaginable representation.

In the exploded view shown in FIG. 8*a*, the following components are depicted:

- the pins 324*a*, 324*b* on the edges of the top patch for connection to the capacitive pads 123*a* on top substrate,
- the feed pins 122*a*, 122*b* for the top patch,
- the top patch metal sheet 121,
- the substrate 220 for the top patch with ground on the bottom side 805, through-holes 806 for the feed pins and capacitive pads 123*a* on the top side,
- an adhesive layer 221, e.g., a double-sided tape to connect the top patch to the bottom patch,
- the pins 112*a*, 112*b* on the edges of the bottom patch for connection to the capacitive pads 113*a* on bottom substrate,
- the feed pins 314*a*, 314*b* for the bottom patch,
- the bottom patch metal sheet 111 with through holes 812 for the pins to the top patch,
- the substrate 210 for the bottom patch with ground on the bottom side 814, capacitive pads 113*a* on the top side, and cuts 816 for the feed pins of bottom and top patch.

FIG. 8*b* shows a zoom of the exploded view of the stacked patch antenna device 300 shown in FIG. 8*a*.

In the zoom, a left-side part 300*a* depicts the components of the top patch while a right-side part 300*b* depicts the components of the bottom patch.

The components of the top patch illustrated in the left-side part 300*a* include the following:

- the pins 324*a*, 324*b* on the edges of the top patch for connection to the capacitive pads 123*a* on top substrate,
- the feed pins 122*a*, 122*b* for the top patch,
- the top patch metal sheet 121,
- the substrate 220 for the top patch with ground on the bottom side 805, through-holes 806 for the feed pins and capacitive pads 123*a* on the top side,
- an adhesive layer 221, e.g., a double-sided tape to connect the top patch to the bottom patch, The components of the bottom patch illustrated in the right-side part 300*b* include the following:

- the pins 112*a*, 112*b* on the edges of the bottom patch for connection to the capacitive pads 113*a* on bottom substrate, the feed pins 314*a*, 314*b* for the bottom patch, the bottom patch metal sheet 111 with through holes 812 for the pins to the top patch, the substrate 210 for the bottom patch with ground on the bottom side 814, capacitive pads 113*a* on the top side, and cuts 816 for the feed pins of bottom and top patch.

Figure 9A:
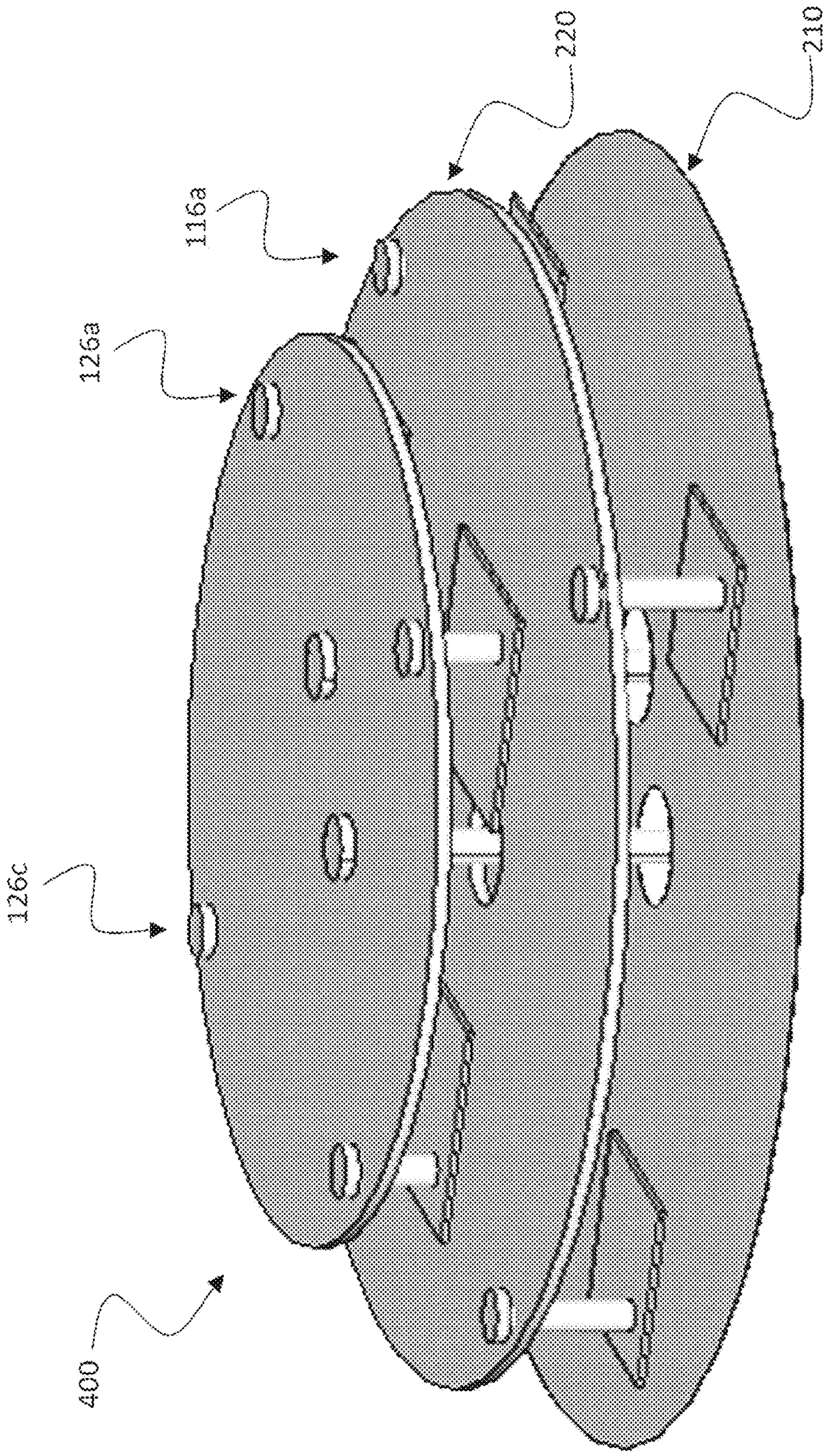
FIG. 9*a* shows a 3-dimensional view of a stacked patch antenna device 400 according to a fourth embodiment.
Figure 9B:
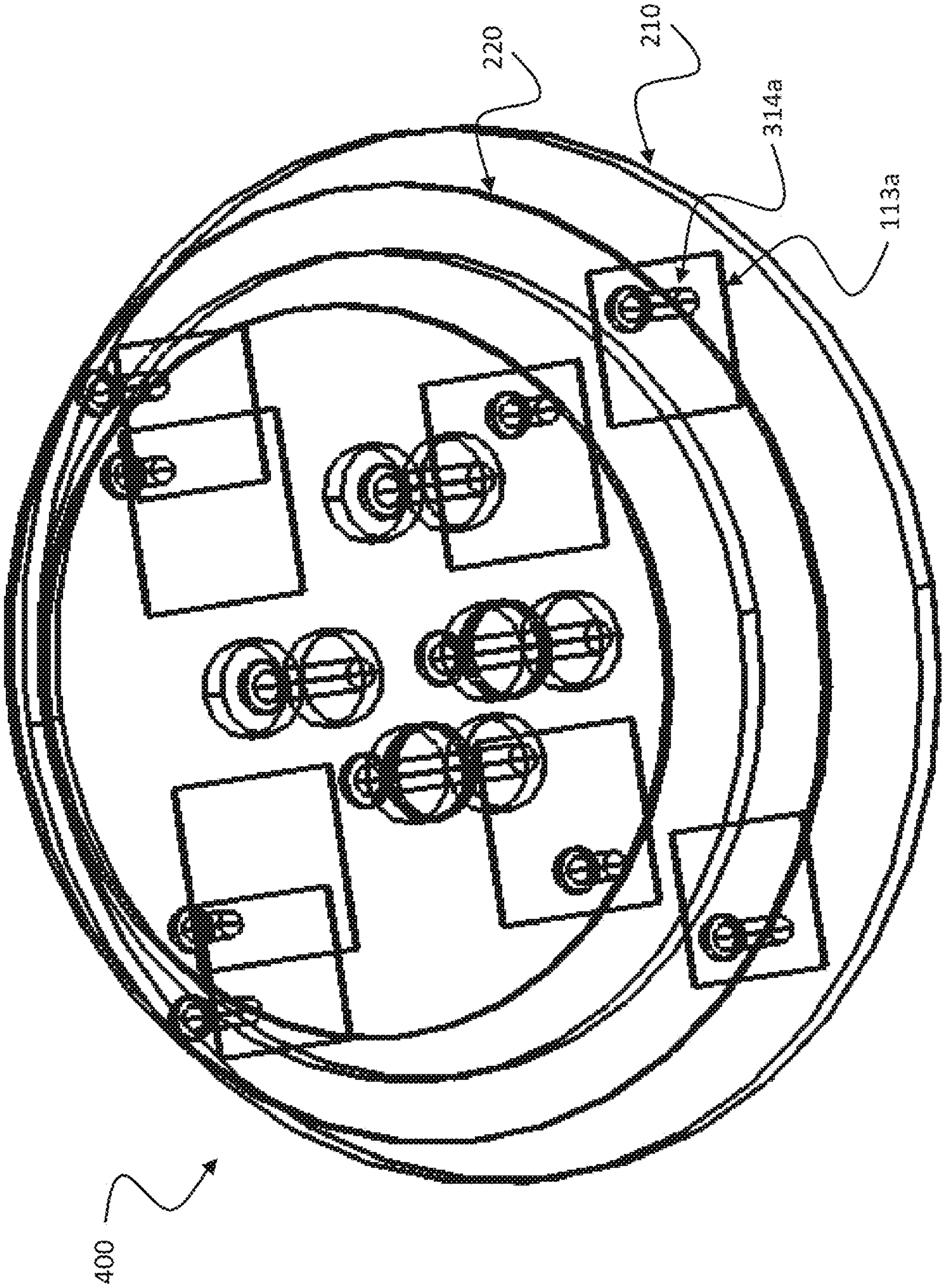
FIG. 9*b* shows another 3-dimensional view of the stacked patch antenna device 400 according to the fourth embodiment.
Figure 9C:
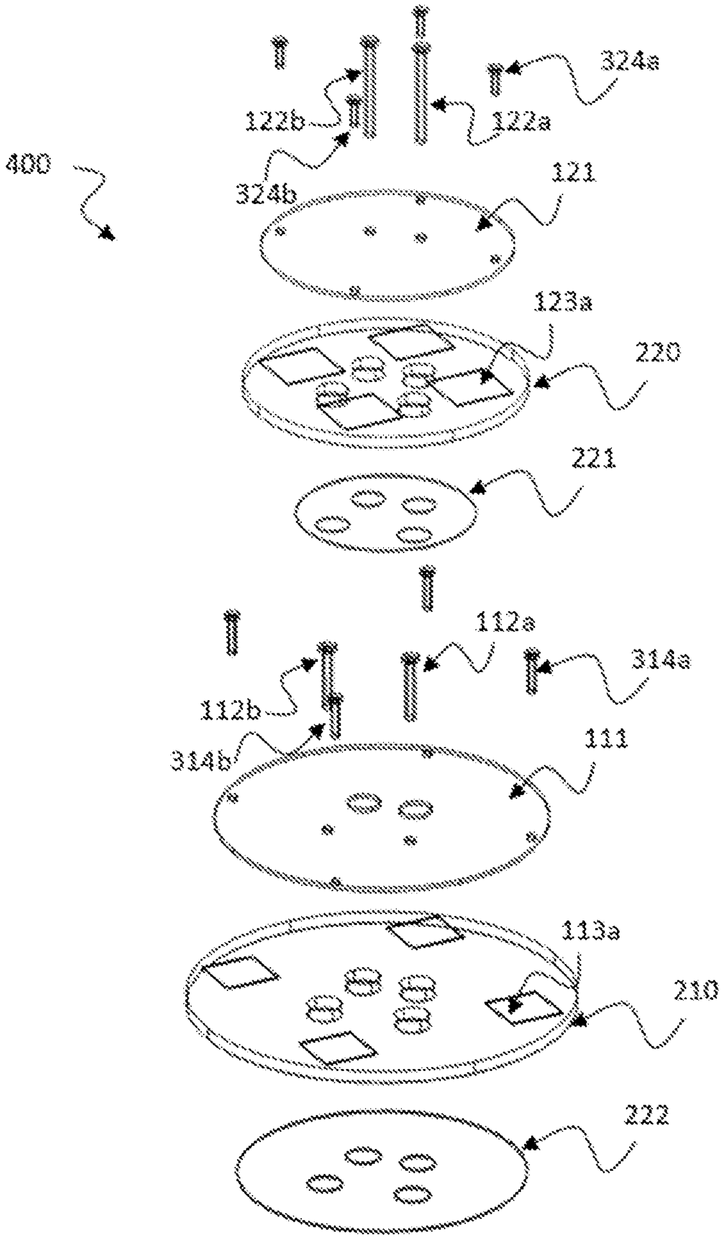
FIG. 9*c* shows an exploded view of the stacked patch antenna device 400 shown in FIGS. 9*a* and 9*b;*

FIGS. 9*a* and 9*b* show two different 3-dimensional views of a stacked patch antenna device 400 according to a fourth embodiment and FIG. 9*c* shows an exploded view of the stacked patch antenna device 400 shown in FIGS. 9*a* and 9*b*.

The stacked patch antenna device 400 comprises a ground layer 130; and a stack of patch antenna elements 110, 120 mounted over each other and over the ground layer 130.

Each patch antenna element 110, 120 of the stack comprises: a metal sheet 111, 121 having a plurality of peripheral areas 116*a*, 116*b*, 126*a*, 126*b*; at least one feeding pin 112*a*, 112*b*, 122*a*, 122*b* configured to connect the patch antenna element 110, 120 to a feeding circuit for inductively feeding the patch antenna element 110, 120; and a plurality of capacitive pads 113*a*, 113*b*, 123*a*, 123*b* for capacitively coupling the patch antenna element 110, 120 with another patch antenna element 110 underneath the patch antenna element 120 or with the ground layer 130.

Each capacitive pad 113*a*, 113*b*, 123*a*, 123*b* is mounted below a respective peripheral area 116*a*, 116*b*, 126*a*, 126*b* of the metal sheet 111, 121 and attached to the respective peripheral area 116*a*, 116*b*, 126*a*, 126*b* of the metal sheet 111, 121 by a metal connector 314*a*, 314*b*, 324*a*, 324*b*.

This fourth embodiment 400 is similar to the third embodiment 300 described above with respect to FIG. 3. The metal connectors 314*a*, 314*b*, 324*a*, 324*b* are not formed from a portion of the metal sheet 111, 121 as shown for the embodiments 100, 200 in FIGS. 1 and 2 but are implemented as metal pins attaching the capacitive pads 113*a*, 113*b*, 123*a*, 123*b* to the respective peripheral area 116*a*, 116*b*, 126*a*, 126*b* of the metal sheet 111, 121, e.g., according to the third embodiment 300 shown in FIG. 3.

The difference to the embodiments 100, 200, 300 described above is that the metal sheets 111, 121 and the corresponding substrate layers 210, 220 for both patches are not rectangular-shaped but circular-shaped as can be seen in the FIGS. 9*a*, 9*b* and 9*c*.

A patch antenna element 110, 120 of the stack may be connected with another patch antenna element 110 of the stack by an adhesive sheet 221, e.g. as shown in FIG. 9*c*. In contrast to the embodiments 100, 200, 300, in this embodiment 400, the adhesive sheet 221 is also circular-shaped in order to connect the dielectric substrate layer 210, 220 of the patch antenna element 110, 120 to the metal sheet 111, 121 of the other patch antenna element 110, 120 underneath the patch antenna element 120.

The patch antenna elements 110, 120 are stacked in air above each other and above the ground layer 130. In the example of FIGS. 9*a*, 9*b* and 9*c*, two patch antenna elements 110, 120 are shown, but it understands that any other number of patch antenna elements can be stacked over each other, e.g., a number of 3, 4, 5, 6, 7, 8, 9, 10, etc. or even only a single patch antenna element can be mounted over the ground layer 130.

For a circular shaped metal sheet as shown in FIGS. 9*a*, 9*b* and 9*c*, the peripheral areas 116*a*, 116*b*, 126*a*, 126*b* can be located at the circumference of the metal sheet, for example with the same circumferential distance between any two of them.

The capacitive pads 113*a*, 113*b*, 123*a*, 123*b* of each patch antenna element 110, 120 are rectangular shaped.

Figure 10A:
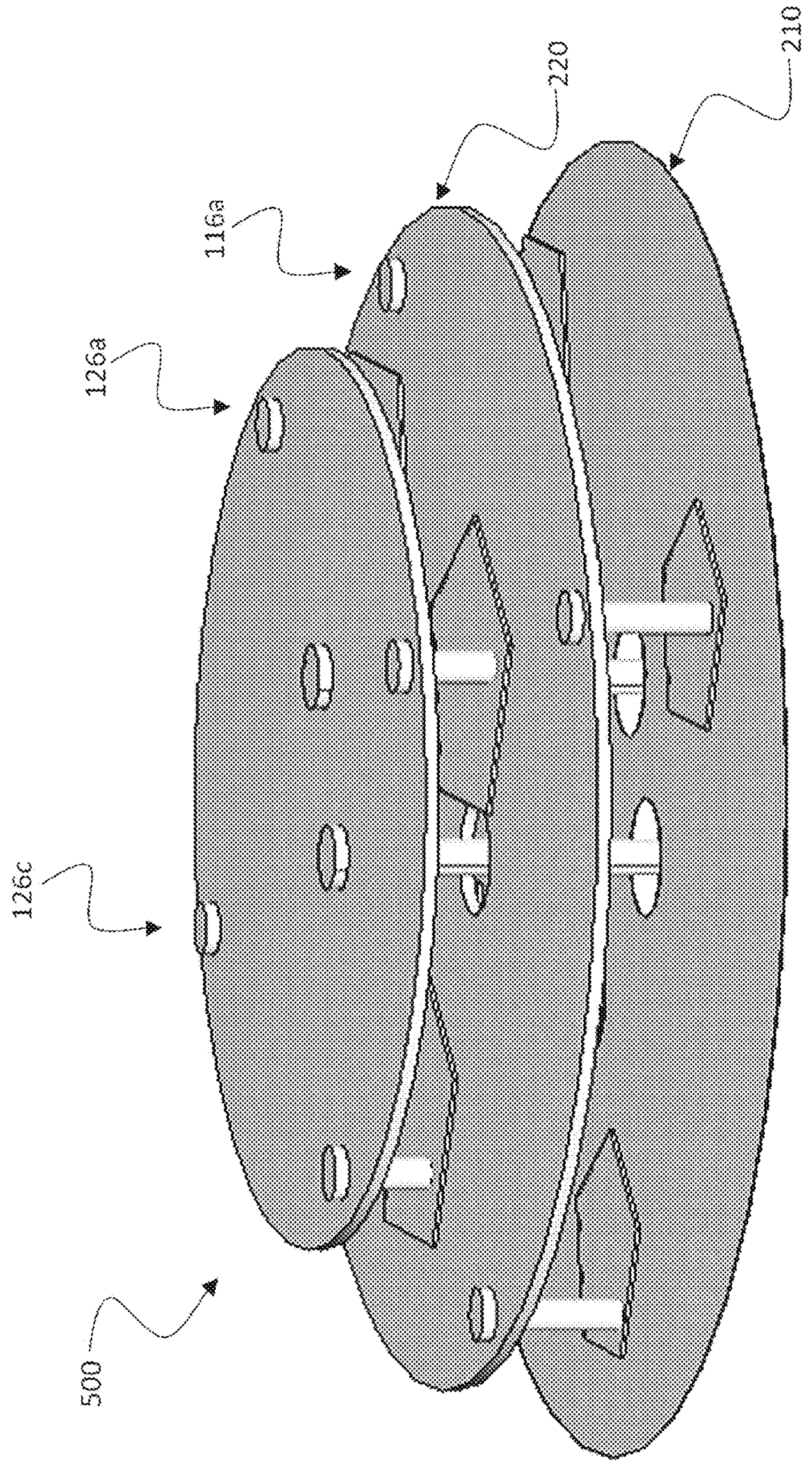
FIG. 10*a* shows a 3-dimensional view of a stacked patch antenna device 500 according to a fifth embodiment.
Figure 10B:
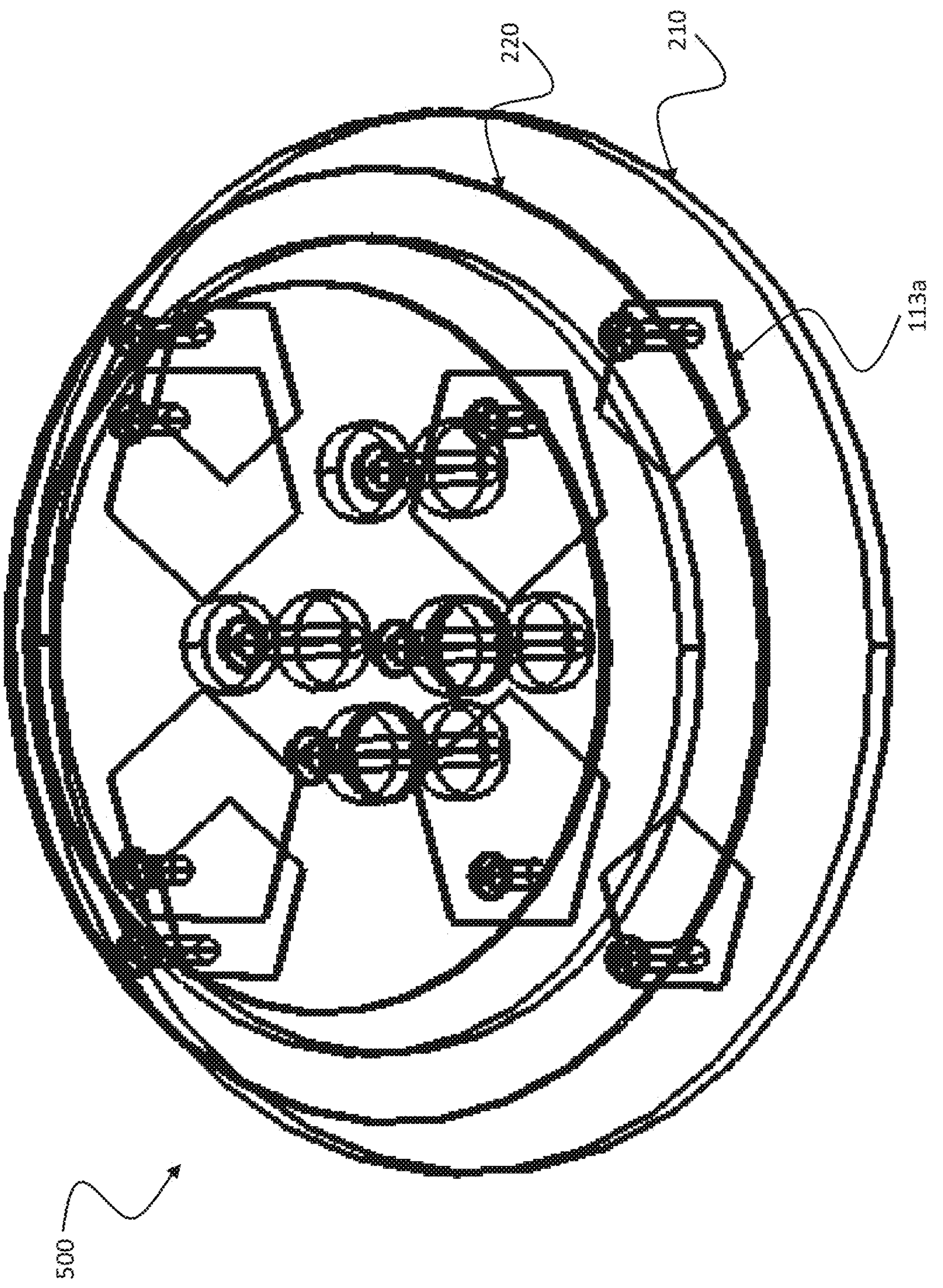
FIG. 10*b* shows another 3-dimensional view of the stacked patch antenna device 500 according to the fifth embodiment.
Figure 10C:
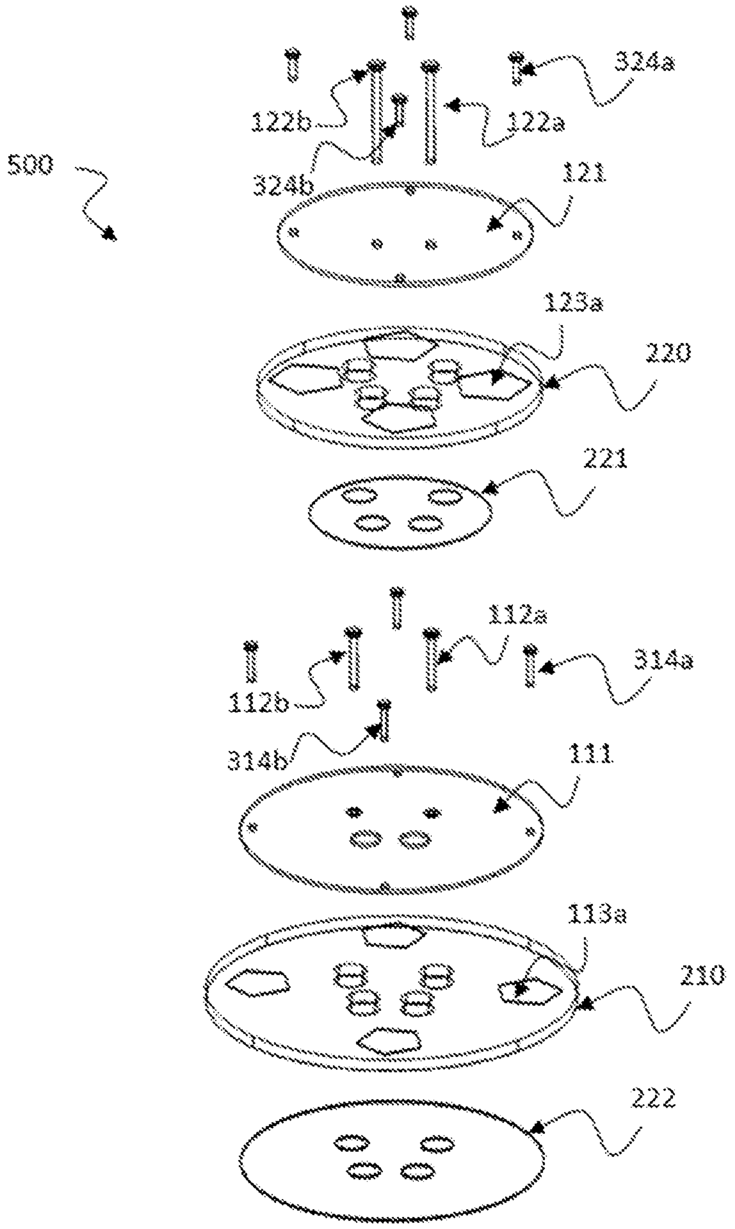
FIG. 10*c* shows an exploded view of the stacked patch antenna device 400 shown in FIGS. 9*a* and 9*b;*

FIGS. 10*a* and 10*b* show two different 3-dimensional views of a stacked patch antenna device 500 according to a fifth embodiment and FIG. 10*c* shows an exploded view of the stacked patch antenna device 500 shown in FIGS. 10*a* and 10*b*.

The stacked patch antenna device 500 comprises a ground layer 130; and a stack of patch antenna elements 110, 120 mounted over each other and over the ground layer 130.

Each patch antenna element 110, 120 of the stack comprises: a metal sheet 111, 121 having a plurality of peripheral areas 116*a*, 116*b*, 126*a*, 126*b*; at least one feeding pin 112*a*, 112*b*, 122*a*, 122*b* configured to connect the patch antenna element 110, 120 to a feeding circuit for inductively feeding the patch antenna element 110, 120; and a plurality of capacitive pads 113*a*, 113*b*, 123*a*, 123*b* for capacitively coupling the patch antenna element 110, 120 with another patch antenna element 110 underneath the patch antenna element 120 or with the ground layer 130.

Each capacitive pad 113*a*, 113*b*, 123*a*, 123*b* is mounted below a respective peripheral area 116*a*, 116*b*, 126*a*, 126*b* of the metal sheet 111, 121 and attached to the respective peripheral area 116*a*, 116*b*, 126*a*, 126*b* of the metal sheet 111, 121 by a metal connector 314*a*, 314*b*, 324*a*, 324*b*.

This fourth embodiment 400 is similar to the fourth embodiment 400 described above with respect to FIGS. 9*a*, 9*b* and 9*c*. The metal connectors 314*a*, 314*b*, 324*a*, 324*b* are not formed from a portion of the metal sheet 111, 121 as shown for the embodiments 100, 200 in FIGS. 1 and 2 but are implemented as metal pins attaching the capacitive pads 113*a*, 113*b*, 123*a*, 123*b* to the respective peripheral area 116*a*, 116*b*, 126*a*, 126*b* of the metal sheet 111, 121, e.g., according to the third embodiment 300 shown in FIG. 3 and according to the fourth embodiment 400 shown in FIGS. 9*a*, 9*b* and 9*c*.

The difference to the embodiments 100, 200, 300 described above is that the metal sheets 111, 121 and the corresponding substrate layers 210, 220 for both patches are not rectangular-shaped but circular-shaped as can be seen in the FIGS. 10*a*, 10*b* and 10*c*.

The difference to the embodiment 400 described above with respect to FIGS. 9*a*, 9*b* and 9*c* is that the capacitive pads 113*a*, 113*b*, 123*a*, 123*b* are not rectangular-shaped but polygonal-shaped, e.g., forming a pentagon as shown in FIGS. 10*a*, 10*b* and 10*c*.

A patch antenna element 110, 120 of the stack may be connected with another patch antenna element 110 of the stack by an adhesive sheet 221, e.g. as shown in FIG. 10*c*. In contrast to the embodiments 100, 200, 300, in this embodiment 500, the adhesive sheet 221 is also circular-shaped in order to connect the dielectric substrate layer 220 of the patch antenna element 120 to the metal sheet 111 of the other patch antenna element 110 underneath the patch antenna element 120.

The patch antenna elements 110, 120 are stacked in air above each other and above the ground layer 130. In the example of FIGS. 10*a*, 10*b* and 10*c*, two patch antenna elements 110, 120 are shown, but it understands that any other number of patch antenna elements can be stacked over each other, e.g., a number of 3, 4, 5, 6, 7, 8, 9, 10, etc. or even only a single patch antenna element can be mounted over the ground layer 130.

For a circular shaped metal sheet as shown in FIGS. 10*a*, 10*b* and 10*c*, the peripheral areas 116*a*, 116*b*, 126*a*, 126*b* can be located at the circumference of the metal sheet, for example with the same circumferential distance between any two of them.

Figure 11:
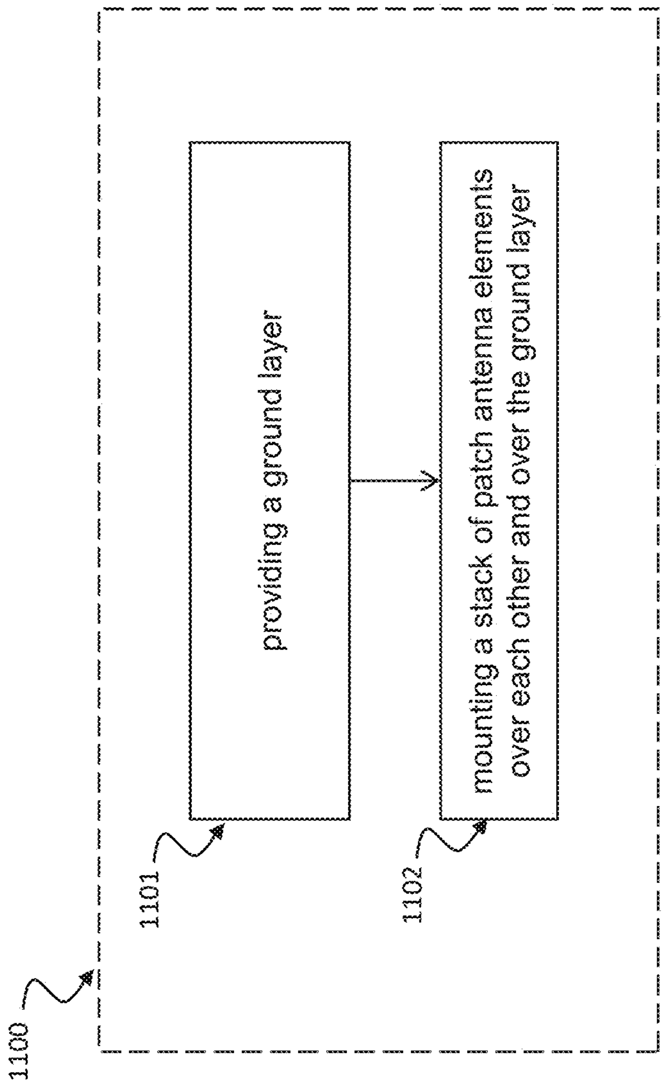
FIG. 11 shows a schematic diagram illustrating a method 1100 for producing a stacked patch antenna device according to the disclosure.

FIG. 11 shows a schematic diagram illustrating a method 1100 for producing a stacked patch antenna device according to the disclosure.

The method 1100 comprises providing 1101 a ground layer.

The method 1100 further comprises: mounting 1102 a stack of patch antenna elements over each other and over the ground layer, wherein each patch antenna element of the stack comprises: a metal sheet having a plurality of peripheral areas; at least one feeding pin configured to connect the patch antenna element to a feeding circuit for inductively feeding the patch antenna element; and a plurality of capacitive pads for capacitively coupling the patch antenna element with another patch antenna element underneath the patch antenna element or with the ground layer, wherein each capacitive pad is mounted below a respective peripheral area of the metal sheet and attached to the respective peripheral area of the metal sheet by a metal connector, e.g. as described above for the corresponding stacked patch antenna devices.

The method can be used for producing a stacked patch antenna device 100, 200, 300, 400, 500 according to any of the first to the fifth embodiments described above. The method achieves the same advantages as described above for the implementation forms of the stacked patch antenna device.

The stacked patch antenna device fabricated by such a method can have reduced size and weight. Due to the reduced amount of substrate the antenna becomes light in weight. The specific design of the stacked patch antenna device allows to reduce fabrication costs.

Figure 12:
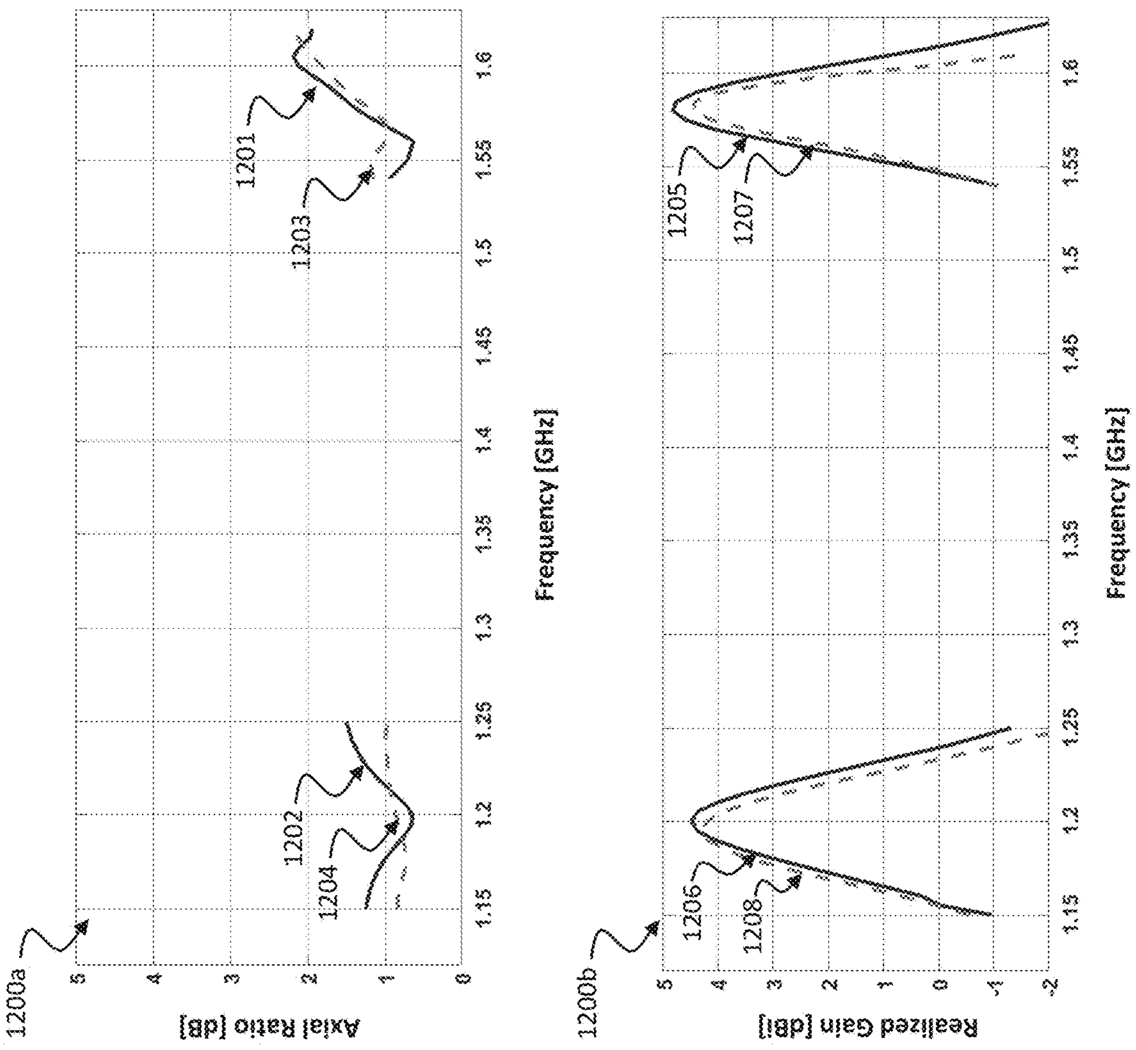
FIG. 12 shows simulation results of the stacked patch antenna device according to the disclosure.

FIG. 12 shows simulation results of the stacked patch antenna device according to the disclosure, on a ground plane size of 100×100 $mm^2$. The upper diagram 1200*a* illustrates zenith axial ratio in dB over frequency in GHz. The lower diagram 1200*b* illustrates maximum realized gain (right hand circular) in dBi over frequency in GHz.

In the upper diagram 1200*a*, the first graph 1201 indicates the stacked patch antenna device 200 according to the second embodiment in L1 frequency band. The second graph 1202 indicates the stacked patch antenna device 200 according to the second embodiment in L5 frequency band.

In the upper diagram 1200*a*, the third graph 1203 indicates the stacked patch antenna device 300 according to the third embodiment in L1 frequency band. The fourth graph 1204 indicates the stacked patch antenna device 300 according to the third embodiment in L5 frequency band.

In the lower diagram 1200*b*, the first graph 1205 indicates the stacked patch antenna device 200 according to the second embodiment in L1 frequency band. The second graph 1206 indicates the stacked patch antenna device 200 according to the second embodiment in L5 frequency band.

In the lower diagram 1200*b*, the third graph 1207 indicates the stacked patch antenna device 300 according to the third embodiment in L1 frequency band. The fourth graph 1208 indicates the stacked patch antenna device 300 according to the third embodiment in L5 frequency band.

Similar results were found for the other first, fourth and fifth embodiments of the stacked patch antenna devices 100, 400, 500 described above.

The simulation results confirm that the concept introduced in this disclosure works and achieves similar performance as a standard GNSS stacked patch antenna.

For the simulation example, the patch dimensions are 42×42×11.5 $mm^3$ compared to a standard stacked patch of 48×48×16 $mm^3$ or 38×38×16 $mm^3$. The disclosed technique of capacitive loading reduces the volume of the stacked patch by roughly 40% or 9% respectively. This reduction is dependent on the dielectric constant of the used substrate and the size of the capacitive pads. For this simulation case a substrate RF-60TC has been used with dielectric constant (Dk) of 6.15 and with a thickness of 1.6 mm.

As indicated above, FIG. 12 illustrates the maximum realized gain (right hand circular) in dBi and the axial ratio in dB over frequency for both the patches (i.e. the second and third embodiments of the stacked patch antenna devices 200, 300) on a ground plane size of 100×100 $mm^2$. The results are similar to the standard patches available. A maximum gain of roughly around 4.5 dBi or higher and an axial ratio below 3 dB over the entire L1 and L2/L5 frequency bands can be achieved.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the present disclosure beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A stacked patch antenna device, comprising:

a ground layer; and a stack of patch antenna elements being mounted over each other and over the ground layer, each patch antenna element of the stack comprising:

a metal sheet having a plurality of peripheral areas;

at least one feeding pin configured to connect a patch antenna element to a feeding circuit for inductively feeding the patch antenna element; and a plurality of capacitive pads for capacitively coupling the patch antenna element with another patch antenna element underneath the patch antenna element or with the ground layer, wherein each capacitive pad is mounted below a respective peripheral area of the metal sheet and attached to the respective peripheral area of the metal sheet by a metal connector.

2. The stacked patch antenna device of claim 1, wherein the metal connector of the metal sheet is formed from a portion of the metal sheet protruding from a respective peripheral area of the metal sheet and which portion of the metal sheet is bent towards the respective capacitive pad.

3. The stacked patch antenna device of claim 1, wherein the metal connector of the metal sheet comprises a metal pin attaching the capacitive pad to the respective peripheral area of the metal sheet.

4. The stacked patch antenna device of claim 1, wherein each capacitive pad of the patch antenna element is capacitively coupled to the metal sheet of the other patch antenna element underneath the patch antenna element or with the ground layer via an air gap.

5. The stacked patch antenna device of claim 1, wherein each patch antenna element of the stack comprises a dielectric substrate layer configured to capacitively couple the capacitive pads of the patch antenna element with the other patch antenna element underneath the patch antenna element or with the ground layer.

6. The stacked patch antenna device of claim 5, wherein the capacitive pads of the patch antenna element are mounted on the dielectric substrate layer of the patch antenna element.

7. The stacked patch antenna device of claim 5, wherein a patch antenna element of the stack is connected with another patch antenna element of the stack by an adhesive sheet.

8. The stacked patch antenna device of claim 7, wherein the adhesive sheet is configured to connect the dielectric substrate layer of the patch antenna element to the metal sheet of the other patch antenna element underneath the patch antenna element.

9. The stacked patch antenna device of claim 1, wherein the patch antenna elements are stacked in air above each other and above the ground layer.

10. The stacked patch antenna device of claim 1, wherein the metal sheet of each patch antenna element is rectangular, square, circular or polygon shaped.

11. The stacked patch antenna device of claim 1, wherein the capacitive pads of each patch antenna element are rectangular, square, circular or polygon shaped.

12. The stacked patch antenna device of claim 1, wherein all the feeding pins of a patch antenna element of the stack are electrically insulated from another patch antenna element of the stack and from the ground layer via through-holes.

13. The stacked patch antenna device of claim 12, wherein all the feeding pins of the patch antenna element extend through the through-holes of the other patch antenna element of the stack and the through-holes of the ground layer.

14. The stacked patch antenna device of claim 1, wherein all the feeding pins are configured to electrically and mechanically connect the patch antenna elements with a printed circuit board comprising the feeding circuit.

15. The stacked patch antenna device of claim 1, wherein each patch antenna element of the stack comprises:

two feeding pins for dual-feeding the patch antenna element in a circular polarization mode.

16. The stacked patch antenna device of claim 15, wherein the two feeding pins are connected to two feeding points on the metal sheet of the patch antenna element, wherein the two feeding points are arranged at an angle of 90 degrees with respect to a center of the metal sheet.

17. The stacked patch antenna device of claim 1, wherein each patch antenna element is configured to receive navigation signals from a Global Navigation Satellite System in a different frequency band.

* * * * *